United States Patent
Zerfass et al.

(10) Patent No.: US 9,843,718 B2
(45) Date of Patent: Dec. 12, 2017

(54) DEVICE AND METHOD FOR OPTIMIZING DETERMINING RECORDING REGIONS

(71) Applicant: Fraunhofer-Gesellschaft zur Foerderung der angewandten Forschung e.V., Munich (DE)

(72) Inventors: Thorsten Zerfass, Nuremberg (DE); Erik Hasslmeyer, Nuremberg (DE); Timo Schlarb, Kirschroth (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 1056 days.

(21) Appl. No.: 13/848,943

(22) Filed: Mar. 22, 2013

(65) Prior Publication Data

US 2013/0250089 A1    Sep. 26, 2013

(30) Foreign Application Priority Data

Mar. 23, 2012 (DE) .................. 10 2012 204 697

(51) Int. Cl.
*H04N 5/232* (2006.01)

(52) U.S. Cl.
CPC ......... *H04N 5/23222* (2013.01); *H04N 5/232* (2013.01)

(58) Field of Classification Search
CPC .......................... H04N 5/232; H04N 5/23222
USPC ............................................. 348/79
See application file for complete search history.

(56) References Cited

U.S. PATENT DOCUMENTS

2012/0092482 A1    4/2012 Shinoda et al.

FOREIGN PATENT DOCUMENTS

WO    2010/114117 A1    10/2010

OTHER PUBLICATIONS

Bellman, "The Structure of Dynamic Programming Processes," Princeton University Press, Chapter III, 1957, pp. 81-115.
Brotcorne et al., "Fast Heuristics for Large Scale Covering-Location Problems," Computer & Operations Research, May 29, 2002, pp. 651-665.
Cook, "The Complexity of Theorem-Proving Procedures," Proceedings of the Third Annual ACM symposium on Theory of Computing, 1971, pp. 1-7.

(Continued)

*Primary Examiner* — Christopher S Kelley
*Assistant Examiner* — Maria Vazquez Colon
(74) *Attorney, Agent, or Firm* — Keating & Bennett, LLP

(57) ABSTRACT

A device for establishing one or several recording regions from an image region is provided. The device includes a neighborhood determining unit for determining whether two objects of the image region are neighboring. Additionally, the device includes a graph set determining unit for determining a graph set such that the graph set includes one or several complete graphs, each element of the complete graph being neighboring to every other element of this complete graph. Furthermore, the device includes a selection set determining unit configured to add a complete graph to the selection set when one of the elements of an object set is included by precisely this one of the complete graphs of the graph set. In addition, the device includes a recording region determining unit for determining the one or several recording regions based on the complete graphs of the selection set.

18 Claims, 13 Drawing Sheets

(56) References Cited

OTHER PUBLICATIONS

Fan et al., "An Efficient Approach for Point Coverage Problem of Sensor Network," Proceedings of the 2008 International Symposium on Electronic Commerce and Security, 2008, pp. 124-128.
Hochbaum et al., "Approximation Schemes for Covering and Packing Problems in Image Processing and VLSI," Journal of the Association for Computing Machinery, vol. 32, No. 1, Jan. 1985, pp. 130-136.
Karp, "Reducibility Among Combinatorial Problems," Publisher for Complexity of Computer Computations, 1972, pp. 85-103.
Porschen, "Algorithms for Rectangular Covering Problems," ICCSA, 2006, pp. 40-49.
Porschen, "On Problems With Closure Properties," IMECS, 2011, 5 pages.
Hoad et al.; "Automatic Control of Camera Pan, Zoom and Focus for Improving Object Recognition"; Image Processing and Its Applications; No. 410, 1995, pp. 291-295.
Goldberger et al.; "A Hierarchical Clustering Algorithm Based on the Hungarian Method"; Pattern Recognition Letters; vol. 29; No. 11; 2008; 15 pages.

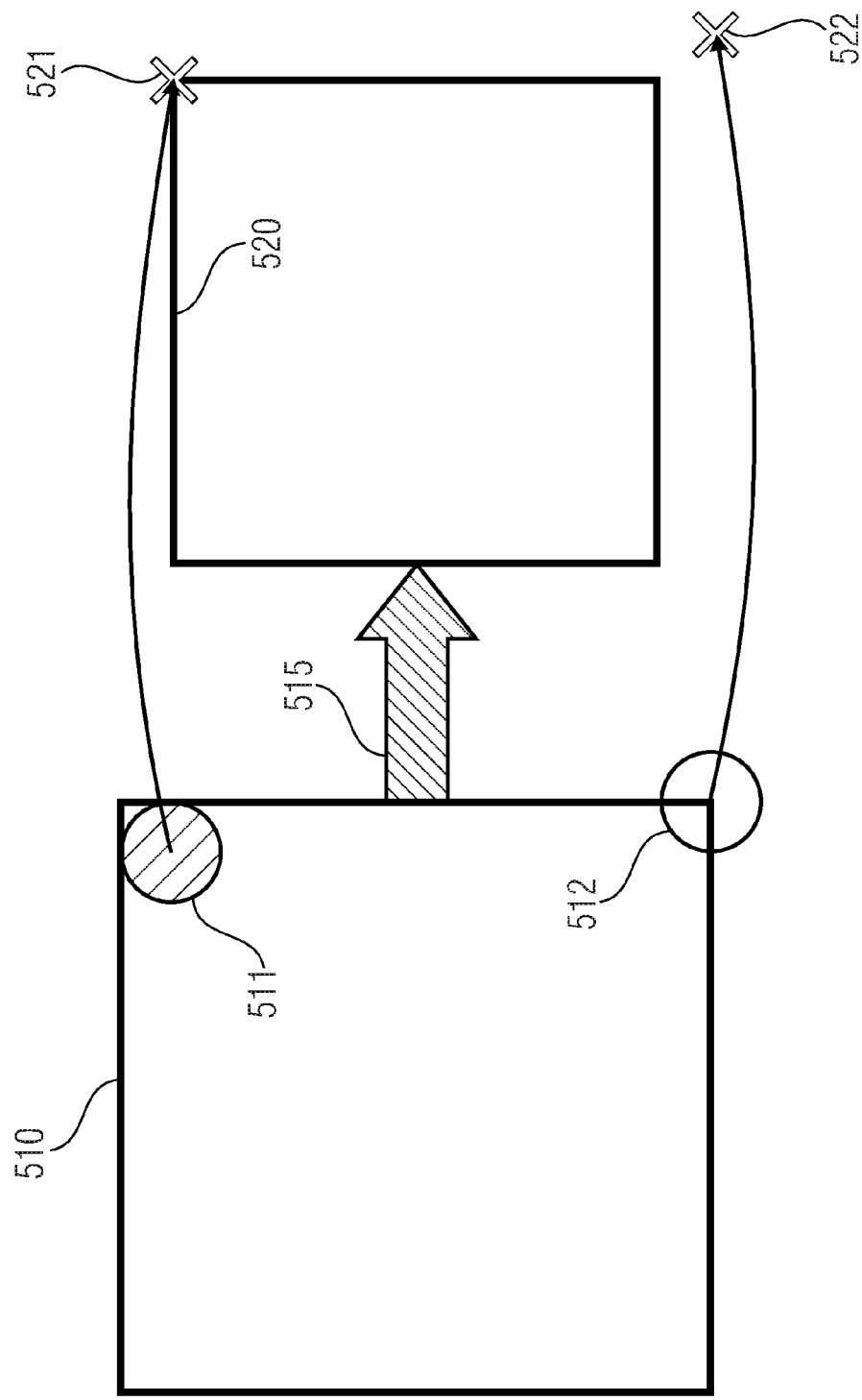

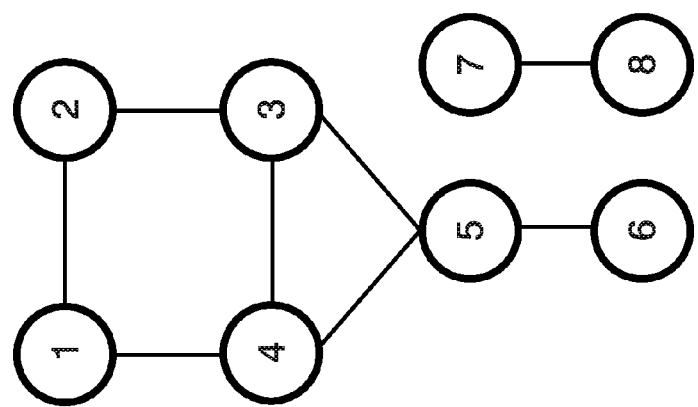
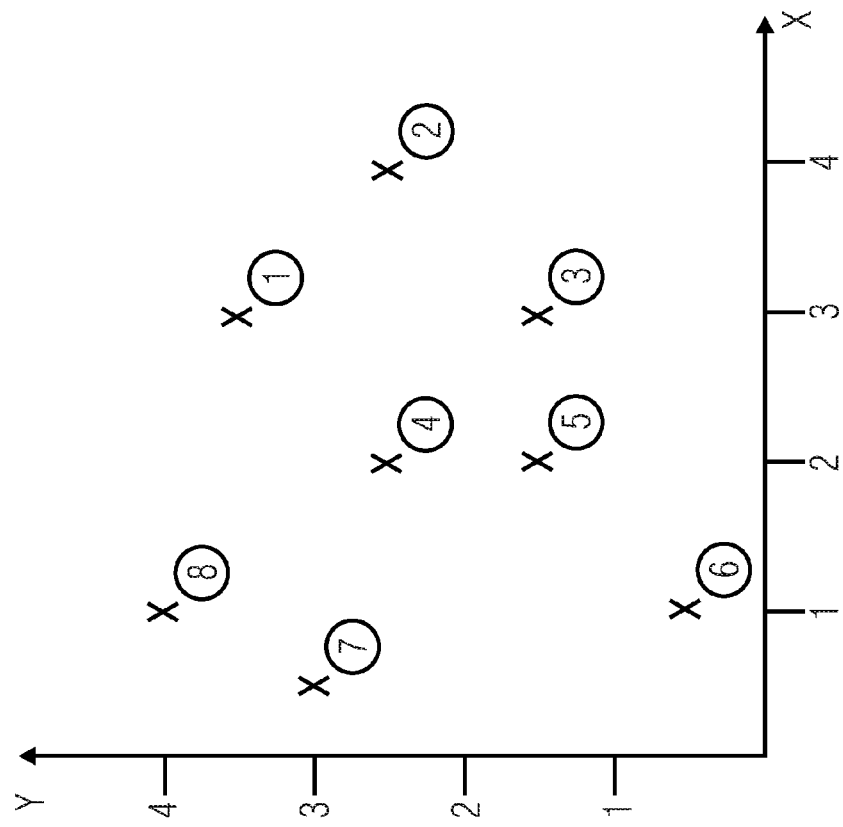
FIGURE 6B
FIGURE 6A

DEVICE AND METHOD FOR OPTIMIZING DETERMINING RECORDING REGIONS

CROSS-REFERENCE TO RELATED APPLICATION

This application claims priority from German Patent Application No. 102012204697.6, which was filed on Mar. 23, 2012, and is incorporated herein by reference in its entirety.

BACKGROUND OF THE INVENTION

The present invention relates to a device and a method for optimizing determining recording regions and, in particular, to a device and a method for establishing one or several recording regions from an image region such that they cover the total number of all the recording regions of all the objects in the image region.

The selective selection of recording regions serving to cover all the objects in an image region is of great importance. Examples of application may, for example, be found in computer-assisted microscopy. Here, objects are localized in recordings of small magnification in a first step and approached again and recorded at high magnification in a second step. The problem arising is that the image sector available in the higher magnification is not sufficient for detecting all the objects found in the detection step using a single recording. Consequently, it is necessary to do recordings at several positions. One way of covering all the objects by different recordings would be doing a separate recording for each object. However, such a procedure would be highly inefficient since every recording entails time-consuming steps. A step of recording includes time-consuming focusing, approaching the position and the actual image recording using a camera. Additionally, memory resources may have to be made available for each one of the images recorded and the great number of images recorded would correspondingly necessitate a large amount of memory resources. Consequently, it is desirable to keep the number of recording regions necessitated which cover all the objects of an image region as small as possible.

Covering as many objects of an image region as possible using a single recording has already been attempted in known technology, i.e. trying to establish one or several recording regions, wherein a recording region may be recorded each using a single recording by a camera in the magnification desired. Different heuristic methods for optimizing recording or covering regions, as are exemplarily illustrated in documents [7], [8], [4], [5] and [2], can be found in known technology.

However, one problem not solved by known technology is how the number of recording regions, i.e., in the end, the number of recordings at high magnification taken by a camera, can be kept as small as possible and how determining these recording regions may be performed as quickly as possible, i.e. as efficiently as possible, using the least possible computing resources.

SUMMARY

According to an embodiment, a device for establishing one or several recording regions in an image region, the image region including objects such that the recording regions cover all the objects of the image region, an object set being defined by each element of the object set representing one of the objects of the image region each, and each object of the image region being represented by an element of the object set each, a first and a second element of the object set being neighboring when a first object of the image set represented by the first element of the object set is neighboring to a second object of the image set represented by the second element of the object set, may have: a neighborhood determining unit for determining whether two objects of the image region are neighboring, a graph set determining unit for determining a graph set such that the graph set includes one or several complete graphs, each of the complete graphs including at least one element of the object set, each of the elements of the object set being included by at least one of the complete graphs of the graph set, each element of the complete graphs being neighboring to every other element of this complete graph, wherein it is impossible to form from the elements of the object set any other graph containing all the elements of one of the complete graphs of the graph set and at least another element of the object set such that each element of the other graph is neighboring to every other element of the other graph, a selection set determining unit for determining a selection set, the selection set determining unit being configured to determine for at least one of the elements of the object set whether the element is included by precisely one of the complete graphs of the graph set, and wherein the selection set determining unit is configured to add, when one of the elements of the object set is included by precisely one of the complete graphs of the graph set, this complete graph to the selection set, and a recording region determining unit for determining the one or several recording regions in the image region, the recording region determining unit being configured to determine for each of the complete graphs of the selection set, one of the recording regions in the image region each such that each of the recording regions covers all the objects of the image region which are represented by the elements of its complete graph.

According to another embodiment, a device for setting a camera position may have: a device for establishing one or several recording regions as mentioned above, and a device for positioning, the device for positioning being configured to set the recording position of a camera based on a recording region of the recording regions determined by the selection set determining unit such that this recording region can be recorded completely by the camera.

According to another embodiment, a method for establishing one or several recording regions in an image region, the image region including objects such that the recording regions cover all the objects of the image region, an object set being defined by each element of the object set representing one of the objects of the image region each, and each object of the image region being represented by an element of the object set each, a first and a second element of the object set being neighboring when a first object of the image set represented by the first element of the object set is neighboring to a second object of the image set represented by the second element of the object set, may have the steps of: determining whether two objects of the image region are neighboring, determining a graph set such that the graph set includes one or several complete graphs, each of the complete graphs including at least one element of the object set, each of the elements of the object set being included by at least one of the complete graphs of the graph set, each element of the complete graph being neighboring to every other element of this complete graph, wherein it is impossible to form from the elements of the object set any other graph which contains all the elements of one of the complete graphs of the graph set and at least another element of the object set such that each element of the other graph is neighboring to every other element of the other graph, determining a selection set, wherein it is determined for at least one of the elements of the object set whether the element is included by precisely one of the complete graphs of the graph set, and wherein, when one of the elements of the object set is included by precisely one of the complete graphs of the graph set, this complete graph is added to the selection set, and determining the one or several recording regions in the image region, wherein one of the recording regions in the image region each is determined for each of the complete graphs of the graph set such that each of the recording regions covers all the objects of the image region represented by the elements of its complete graph.

Another embodiment may have a computer program for performing the method as mentioned above when the computer program runs on a computer or microprocessor.

A device for establishing one or several recording regions from an image region is provided. The device includes a neighborhood determining unit for determining whether two objects of the image region are neighboring. Additionally, the device includes a graph set or quantity determining unit for determining a graph set such that the graph set includes one or several complete graphs, wherein each element of the complete graph is neighboring to every other element of this complete graph. Additionally, the device includes a selection set determining unit configured to add a complete graph to the selection set when one of the elements of an object set is included by precisely this one of the complete graphs of the graph set. Furthermore, the device includes a recording region determining unit for determining the one or several recording regions based on the complete graphs of the selection set.

In one embodiment, a device for establishing one or several recording regions in an image region is provided, the image region including objects such that the recording regions cover all the objects of the image region.

An object set is defined by each element of the object set representing one of the objects of the image region each and by each object of the image region being represented by one element of the object set each. A first and a second element of the object set are neighboring when a first object of the image set represented by the first element of the object set is neighboring to a second object of the image set represented by the second element of the object set.

The device includes a neighborhood determining unit for determining whether two objects of the image region are neighboring.

Additionally, the device includes a graph set determining unit for determining a graph set such that the graph set includes one or several complete graphs, each of the complete graphs including at least one element of the object set, each of the elements of the object set being included by at least one of the complete graphs of the graph set, each element of the complete graph being neighboring to every other element of this complete graph, wherein it is impossible to form from the elements of the object set any other graph which contains all the elements of one of the complete graphs of the graph set and at least one other element of the object set such that each element of the other graph is neighboring to every other element of the other graph.

In addition, the device includes a selection set determining unit for determining a selection set, the selection set determining unit being configured to determine, for at least one of the elements of the object set, whether the element is included by exactly one of the complete graphs of the graph set, and the selection set determining unit being configured to add, when one of the elements of the object set is included by exactly one of the complete graphs of the graph set, this complete graph to the selection set.

In addition, the device includes a recording region determining unit for determining the one or several recording regions in the image region, the recording region determining unit being configured to determine, for each of the complete graphs of the selection set, one of the recording regions in the image region each such that each of the recording regions covers all the objects of the image region which are represented by the elements of its complete graph.

The number of recordings within an analysis process may be reduced considerably and thus the entire recording process be accelerated by the concepts of the present invention. The concepts presented differ from known technology, among other things, in that at first the optimum recording positions are determined using a direct solution method. Only if, after applying same, there are still points not covered by a recording region, will more complicated concepts or heuristics be applied in order to solve the, then strongly reduced, problem. The concepts known from conventional technology, however, do not perform initial reduction of the problem, but instead try to directly apply complicated methods or heuristics on the basis of the entire problem.

In accordance with one embodiment, a graph set which includes one or several complete graphs of the elements of the object set is pre-processed by performing a check as to unambiguity. If an element of the object set (the elements of the object set each representing an object of the image region) is present only in a single one of the complete graphs, a separate recording region will be necessitated for the objects represented by the elements of this complete graph. The complete graph determined in this way is added to a selection set and may then be removed from the graph set. Only after having removed from the graph set all the complete graphs containing an object which is present in only one complete graph, will more complex and more complicated approaches with regard to the complete graphs still remaining in the graph set be applied so as to determine the further recording regions necessitated for covering the objects of the image region not yet covered. This results in a significant reduction in the problem of determining the recording regions, which in turn results in a considerable reduction in the computing resources requirements.

In one embodiment, the selection set determining unit may be configured to determine the selection set such that all the elements of the object set are contained in at least one of the complete graphs of the selection set.

In accordance with another embodiment, the selection set determining unit may be configured to remove, when one of the elements of the object set is included by exactly one of the complete graphs of the graph set, this complete graph from the graph set and to remove the elements of this complete graph from the object set. The selection set determining unit here may be configured to determine whether at least one of the elements which are still contained in the object set is included by exactly one of the complete graphs still contained in the graph set.

In addition, the selection set determining unit may be configured to perform a threshold value test when none of the elements contained in the object set are included by exactly one of the complete graphs contained in the graph set. Thus, the selection set determining unit may be configured to perform either a first selection algorithm when the result of the threshold value test is that a number of the complete graphs contained in the graph set is greater than a predetermined threshold value, or else to execute a second, different selection algorithm when the result of the threshold value test is that the number of the complete graphs contained in the graph set is smaller than or equal to the predetermined threshold value. Additionally, the selection set determining unit may be configured to add, when executing the first selection algorithm or the second selection algorithm, at least one of the complete graphs of the graph set to the selection set.

In another embodiment, the selection set determining unit may be configured to select, when executing the first selection algorithm, one of the complete graphs of the graph set which has the largest number of elements of all the complete graphs of the graph set.

Furthermore, the selection set determining unit may be configured to determine from the complete graphs of the graph set and add to the selection set that complete graph for which the number of the further complete graphs which have to be added to the selection set in order for the selection set to include all the elements of the object set is minimal.

In another embodiment, a position may be allocated to each of the objects of the image region, the position including an x coordinate value and a y coordinate value. Thus, the neighborhood determining unit may be configured to establish whether two of the objects of the image region are neighboring such that two of the objects of the image region will be neighboring exactly if a first absolute difference of the x coordinate values of the two objects is smaller than or equal to a first maximum x distance value, and if a second absolute difference of the y coordinate values of the two objects is smaller than or equal to a second maximum y distance value.

In accordance with an embodiment, the neighborhood determining unit may additionally be configured to provide a neighborhood set for determining the graph set by the graph set determining unit, the neighborhood set including all the pairs of elements of the object set such that each of the pairs contains two elements which represent two objects of the image region which are neighboring.

In another embodiment, the device may additionally include an object sorting unit, wherein the object sorting unit may be configured to sort the elements of the object set based on the x coordinate values of the objects of the image region which are represented by the elements of the object set so as to obtain a sorted arrangement of the elements of the object set. Thus, the neighborhood determining unit may be configured to determine the neighborhood set based on the sorted arrangement of the elements of the object set.

In accordance with one embodiment, the neighborhood determining unit may be configured to determine the neighborhood set such that, for an element considered from the sorted arrangement of elements of the object set, in an order predetermined by the sorted arrangement, beginning with the direct successor of the element considered, one of the successors of the element considered each is checked as to whether the element considered and the respective successor are neighboring until the absolute difference of the x coordinate values of the object represented by the element considered and the object represented by the successor is greater than the first maximum x distance value.

In accordance with another embodiment, the device may additionally comprise a cluster set determining unit configured to determine one or several cluster sets based on the neighborhood set such that each of the pairs of the neighborhood set is contained in exactly one of the cluster sets, wherein no pair of one of the cluster sets contains an element which is neighboring to an element of another pair of another cluster set. Thus, the graph set determining unit may be configured to determine the graph set based on the one or several cluster sets.

Additionally, in accordance with another embodiment, the device may include a position determining unit, each of the objects of the object set comprising an extension, wherein the position determining unit may be configured to determine, for each object, the x coordinate value associated to the object, and the y coordinate value of the object associated to the object, by establishing a selected x coordinate value of the object and a selected y coordinate value of the object, the selected x coordinate value and the selected y coordinate value identifying a position within the object or on an edge line of the object. Exemplarily, the center or the center of gravity of an object may represent the position of the object. In other embodiments, a different point within the object may be used for determining its position.

In another embodiment, the position determining unit may be configured to determine the first maximum x distance value as a difference of a first extension of one of the recording regions in the x direction and a first predefined maximum object extension in the x direction, wherein the position determining unit may additionally be configured to determine the second maximum y distance value as a difference of an extension of this recording region in the y direction and a second predetermined maximum object extension in the y direction.

In accordance with another embodiment, the recording region determining unit may be configured to determine, for each of the complete graphs of the selection set, a center for the respective one of the recording regions by applying the following formula:

$$M_x = (\text{Max}(\{x_j | \forall j \in C_i\}) + \text{Min}(\{x_j | \forall j \in C_i\}))/2$$

$$M_y = (\text{Max}(\{y_j | \forall j \in C_i\}) + \text{Min}(\{y_j | \forall j \in C_i\}))/2$$

$C_i$ identifying a set or quantity representing the i-th complete graph of the selection set, j identifying the j-th element of the elements contained in the complete graph, $x_j$ identifying the x coordinate value of the object represented by the j-th element of the complete graph, $y_j$ identifying the y coordinate value of the object represented by the j-th element of the complete graph, Max identifying a maximum and Min identifying a minimum.

In another embodiment, a device for setting a camera position is provided, including a device for establishing one or several recording regions in accordance with one of the above embodiments, and a device for positioning, the device for positioning being configured to set the recording position of a camera based on a recording region of the recording regions determined by the selection set determining unit such that this recording region may be recorded completely by the camera.

In accordance with another embodiment, a method for establishing one or several recording regions in an image region is provided, the image region including objects such that the recording regions cover all the objects of the image region. The method includes the following steps:

determining whether two objects of an image region are neighboring, determining a graph set such that the graph set includes one or several complete graphs, each of the complete graphs including at least one element of an object set, each of the elements of the object set being included by at least one of the complete graphs of the graph set, each element of the complete graph being neighboring to every other element of this complete graph, wherein it is impossible to form from the elements of the object set any other graph which contains all the elements of one of the complete graphs of the graph set and at least one element of the object set such that each element of the other graph is neighboring to every other element of the other graph, determining a selection set, wherein it is determined for at least one of the elements of the object set whether the element is included by precisely one of the complete graphs of the graph set, and wherein, when one of the elements of the object set is included by exactly one of the complete graphs of the graph set, this complete graph is added to the selection set, and determining the one or several recording regions in the image region, wherein one of the recording regions in the image region each is determined for each of the complete graphs of the selection set such that each of the recorded regions covers all the objects of the image region which are represented by the elements of its complete graph.

Additionally, a computer program is provided which is configured to perform the method described above when the computer program runs on a computer or microprocessor.

BRIEF DESCRIPTION OF THE DRAWINGS

Embodiments of the invention will be described below referring to the drawings, in which:

FIG. 5 shows a transformation of objects with an extension to two point-shaped objects with no extension in accordance with an embodiment, FIG. 6a illustrates point-shaped objects in a two-dimensional coordinate system, FIG. 6b shows a neighborhood graph of the point-shaped objects of FIG. 6a in accordance with an embodiment;

DETAILED DESCRIPTION OF THE INVENTION

Figure 1:
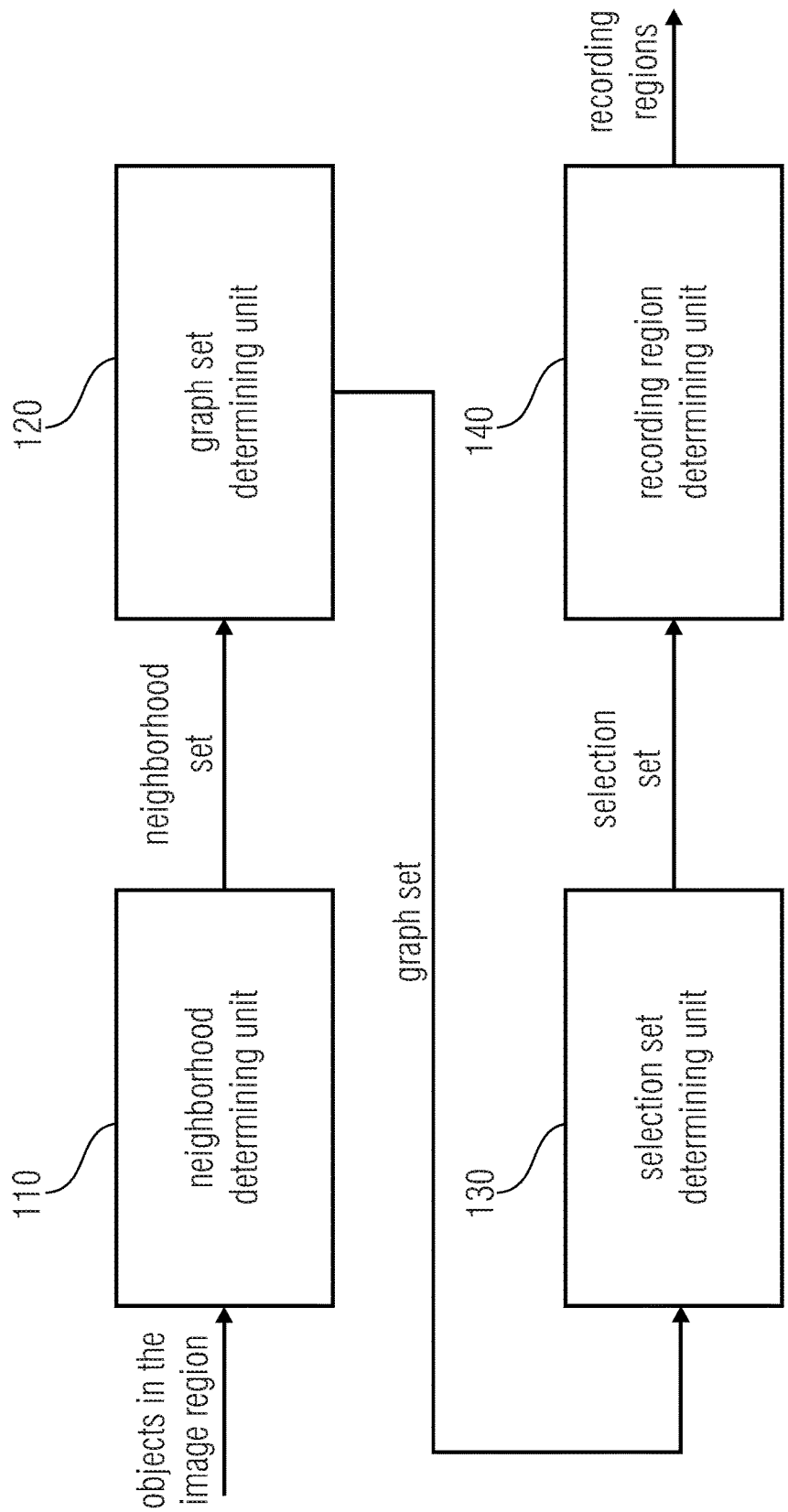
FIG. 1 illustrates a device for establishing one or several recording regions from an image region in accordance with an embodiment.

FIG. 1 shows a device for establishing one or several recording regions from an image region in accordance with an embodiment such that the recording regions cover all the objects in the image region. The device includes a neighborhood set determining unit 110, a graph set determining unit 120, a selection set determining unit 130 and a recording region determining unit 140.

The neighborhood determining unit 110 is configured to determine whether two of the elements of the object set are neighboring, wherein the elements of the object set represent the objects of the image region. The neighborhood determining unit 110 may use a neighborhood criterion for this. This neighborhood criterion may exemplarily be selected considering the size of a recording region (recording window), such as, for example, considering the extension of the recording window in the x direction and the extension of the recording region in the y direction. The extension of the recording region in the x direction may, reduced by a maximum extension of the objects in the x direction, define a first maximum x distance value. The extension of the recording region in the y direction may, reduced by a maximum extension of the objects in the y direction, define a second maximum y distance value. The recording region here exemplarily describes that region which may be recorded by a camera at a desired magnification.

The neighborhood determining unit 110 may additionally be configured to determine a neighborhood set which includes all the pairs of elements of the object set which are neighboring. Two elements of the object set are neighboring when the objects of the image region which are represented by them are neighboring.

Reference here is made to FIGS. 6a and 6b for illustration purposes. In FIG. 6a, the positions of eight objects in a two-dimensional x y coordinate system which represents the positions thereof in a two-dimensional image region are illustrated. The object set, the elements of which represent the objects of the image region, may then exemplarily consist of numbers 1 to 8 (object set={1; 2; 3; 4; 5; 6; 7; 8}).

When considering object No. 7 (i.e. the object identified by 7 which is located at the position (0.5; 3) in the coordinate system), it becomes evident that object 8 is close to object 7. When, for example, a recording region (such as, for example, a recording window) may be positioned such that it includes both point 7 and point 8, which is assumed in the present case, the two points are neighboring. The recording determining unit 110 will establish this in such a case and will add the pair (7; 8) to the neighborhood set.

In the example illustrated in FIG. 6a, for example, a window of a size 1×1 may be used for determining so as to find out whether two points are neighboring. With such an example, objects 7 and 8 at the positions (0.5; 3) and (1; 4) are neighboring for the absolute difference values of their coordinate values are (0.5; 1), meaning that the positions (0.5; 3) and (1; 4) may (just) be covered by a window of a size 1×1. However, objects 7 and 6 at the positions (0.5; 3)

and (1; 0.5) are not neighboring, for the absolute difference values of their coordinate values are (0.5; 2.5), meaning that the positions (0.5; 3) and (1; 0.5) cannot be covered by a window of a size 1×1.

In different examples, the window for determining the existence of neighborhood may be of a different size. A window of a size 2×2; a window of a size 5×1, a window of a size 2×3 or a window having any other dimensions may exemplarily be selected.

In further examples, the window determining the existence of a neighborhood relation may be of a non-rectangular shape. The shape of the window determining the existence of a neighborhood relation may, for example, be circular. In different embodiments, the window may be of any other shape.

Furthermore, the neighborhood determining unit 110 may exemplarily establish that objects 7 and 6 cannot be covered by a single recording region. In this case, the neighborhood determining unit will establish that there is no neighborhood relation between objects 7 and 6 and will not add the pair (6; 7) to the neighborhood set.

FIG. 6b shows a neighborhood graph for the point-shaped objects of FIG. 6a, which illustrates all the neighborhood relations between the elements of the object set. All the objects which are in neighborhood relation to one another are connected by an edge. A respective neighborhood set N may exemplarily be as follows:

N={(1; 2); (1; 4); (2; 3); (3; 4); (3; 5); (4; 5); (5; 6); (7; 8)}.

The neighborhood determining unit 110 may be configured, as is illustrated in FIG. 1, to transfer the neighborhood set to the graph set determining unit 120.

The graph set determining unit 120 of FIG. 1 is configured to determine a graph set such that the graph set includes one or several complete graphs, each of the complete graphs including at least one element of the object set.

Each of the elements of the object set here is included by at least one of the complete graphs, i.e. each object of the image region is represented by at least one object in at least one of the complete graphs of the graph set.

Additionally, in every complete graph, each element is neighboring to every other element of this complete graph. This means that only such elements representing objects of the image region which are all neighboring to one another will be contained in a complete graph.

Figure 8B:
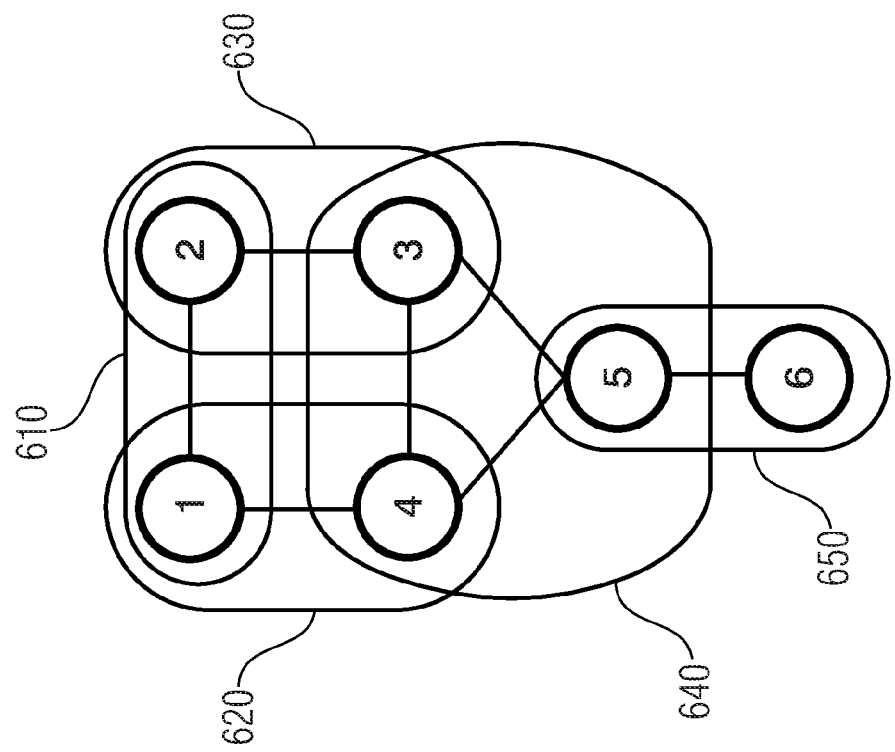
FIG. 8b illustrates the complete graphs of the first partial cluster graph of FIG. 8a in accordance with an embodiment by means of boundaries.
Figure 8A:
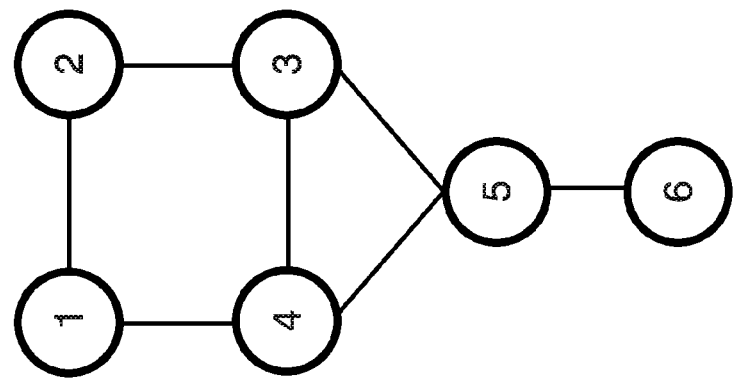
FIG. 8a illustrates the first partial cluster graph.

Reference here is made to FIGS. 8a and 8b for illustration purposes. FIG. 8a illustrates the neighborhood relations between elements 1, 2, 3, 4, 5 and 6. FIG. 8b shows the complete graphs for these elements by boundaries 610, 620, 630, 640 and 650.

FIG. 8b, for example, shows that object 3 is neighboring to both object 4 and object 5, and also shows that object 4 is neighboring to object 5. This means that objects 3, 4 and 5 form a complete graph, indicated by boundary 640.

When considering object 6 in FIG. 8b, it becomes clear that object 6 is neighboring to object 5, but no other object. Consequently, objects 5 and 6 form another complete graph, indicated by boundary 650.

The set of complete graphs G for FIG. 8b may, in terms of quantities, be expressed as follows:

G={{1; 2}, {1; 4}, {2; 3}, {3; 4; 5}, {5; 6}}

Each element of the set G which in turn is expressed as a set thus represents a complete graph, for example the complete graph consisting of elements 3, 4 and 5.

It is to be kept in mind that there is another condition for a complete graph, namely that it is impossible to form another complete graph which contains all the elements of the complete graph and at least one further element of the object set such that each element of this further complete graph will be neighboring to one another. In FIG. 8b, for example, elements 3, 4 and 5 form a complete graph. Elements 3 and 4 alone, however, do not form a complete graph, for they are both contained already in the complete graph {3; 4; 5}. This condition may be expressed by the fact that, with regard to the graph set which is formed by the graph set determining unit 120, it is impossible to form from the element of the object set another graph which contains all the elements of one of the complete graphs of the graph set and at least one further element of the object set such that each element of the other graph is neighboring to every other element of the other graph.

When an object of the image region is not neighboring to any other object of the image region, this object may be represented by a complete graph of the graph set which contains this object as an only element.

The device in accordance with the embodiment shown in FIG. 1 additionally includes the selection set determining unit 130. The selection set determining unit 130 is configured to determine, for at least one of the elements of the object set, whether the element is included by precisely one of the complete graphs of the graph set. This means that the selection set determining unit 130 determines whether there are elements which are contained in only a single one of the complete graphs. If this is the case, the present invention teaches that one of the recording regions to be determined is to include all the objects of the image region which are represented by the elements of this complete graph.

Additionally, the selection set determining unit 130 is configured to add, when the object is included by exactly one of the complete graphs of the graph set, this complete graph to the selection graph. The selection set here represents a set of complete graphs which are to be covered each by a single recording region.

Thus, the selection set determining unit 130 may be configured to determine at first all the complete graphs containing elements which are contained only in a single one of the complete graphs, namely this graph.

The complete graphs determined in this way may be added to the selection set and be removed from the graph set. The overall problem of determining the recording regions thus is reduced to determining the further recording regions based on the complete graphs remaining in the graph set, wherein only those objects of recording regions the representing elements of which are not yet contained in complete graphs which have been added to the selection set are to be covered. Thus, the complexity of the problem of determining the selection regions is reduced considerably by the concept suggested here.

In addition, the device of FIG. 1 includes the recording region determining unit 140 for determining the one or several recording regions in the image region. The recording region determining unit 140 here is configured to determine, for each of the complete graphs of the selection set, one of the recording regions in the image region each such that this recording region includes all the objects represented by elements of the complete graph considered. This means that a separate recording region is provided for each of the complete graphs of the selection set.

Figure 2:
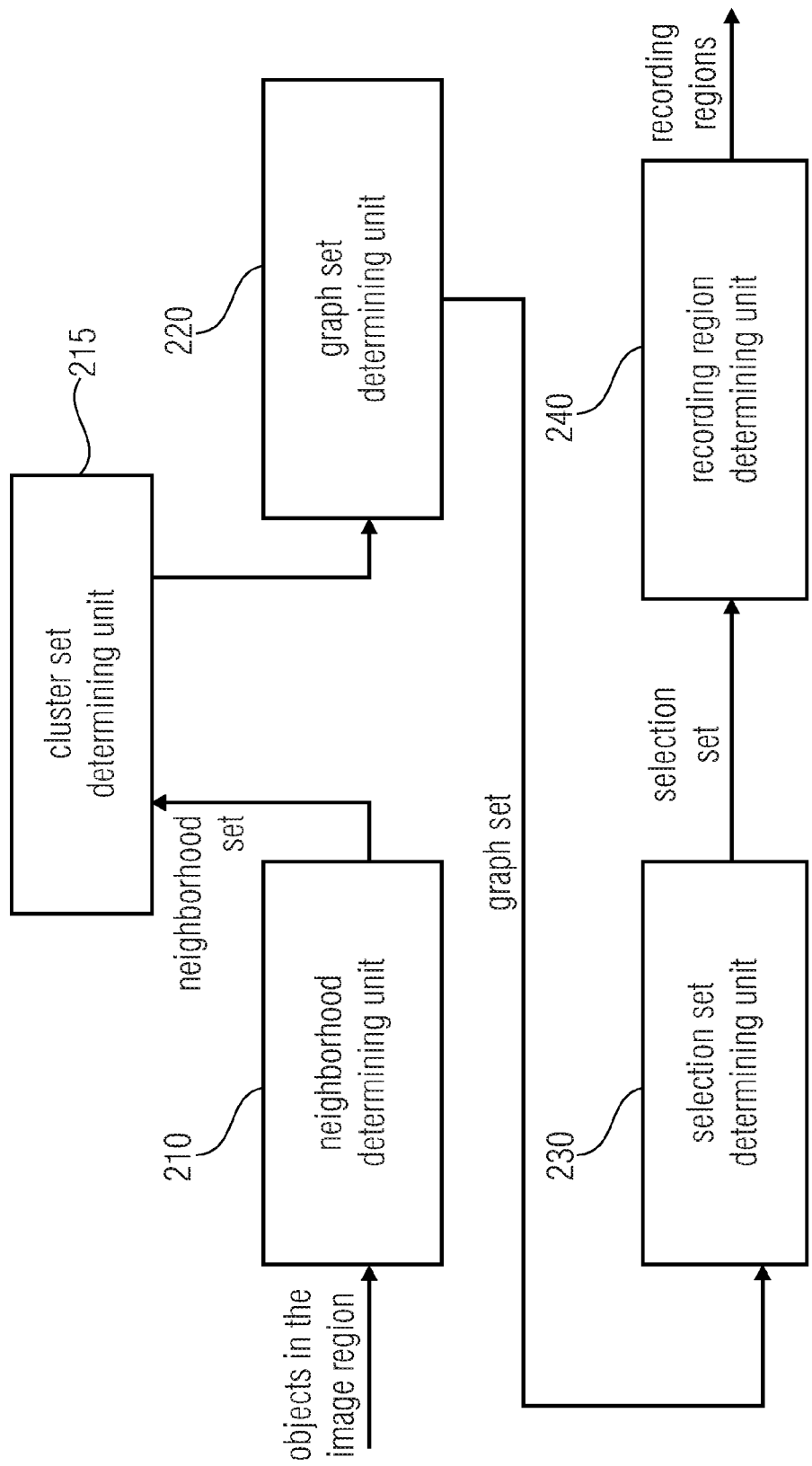
FIG. 2 shows a device for establishing one or several recording regions from an image region in accordance with another embodiment.

FIG. 2 shows a device for establishing one of several recording regions from an image region in accordance with a further embodiment. The device includes a neighborhood determining unit 210, a graph set determining unit 220, a selection set determining unit 230 and a recording region determining unit 240. In addition, the device includes a cluster set determining unit 215.

The neighborhood determining unit 210 determines a neighborhood set, as has already been described for the neighborhood determining unit 110 of FIG. 1, and transfers this neighborhood set to the cluster set determining unit 215.

The cluster set determining unit is configured to determine one or several cluster sets based on the neighborhood set such that each of the pairs of the neighborhood set is contained in exactly one of the cluster sets, wherein no pair of one of the cluster sets contains an element which is neighboring to another element of another pair of another cluster set.

Figure 7C:
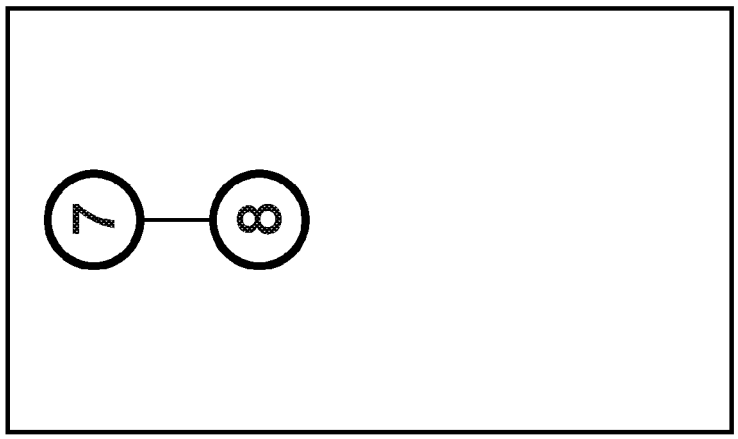
FIG. 7c shows a second partial cluster graph of the neighborhood graph of FIG. 7a in accordance with an embodiment.
Figure 7B:
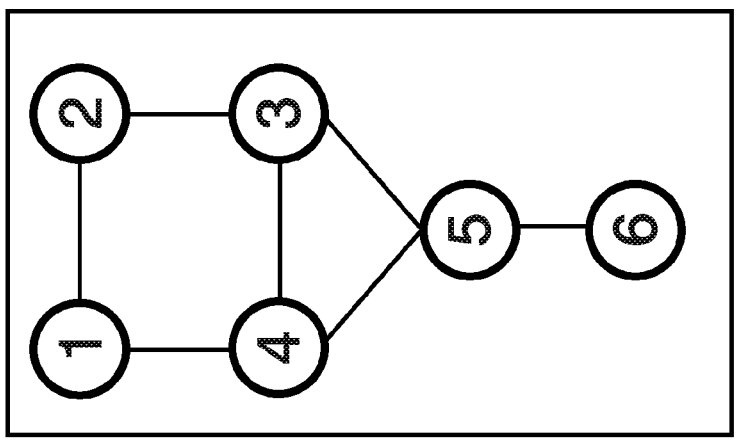
FIG. 7b shows a first partial cluster graph of the neighborhood graph of FIG. 7a in accordance with an embodiment.
Figure 7A:
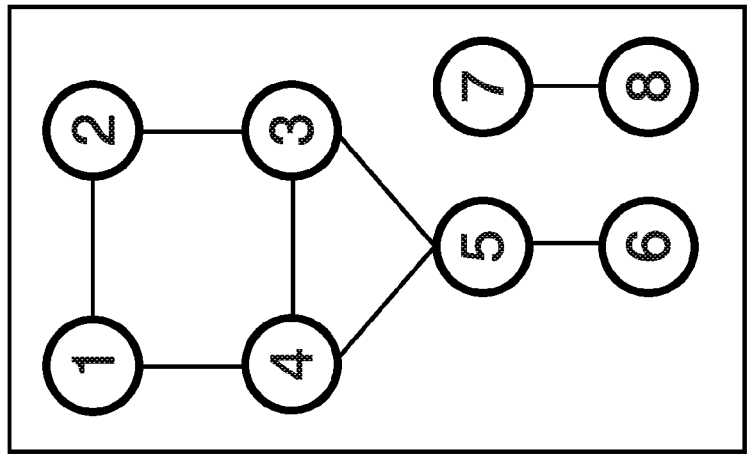
FIG. 7a illustrates a neighborhood graph in accordance with an embodiment.

In the illustrations of FIG. 7a, FIG. 7b and FIG. 7c, each of the cluster sets includes all the elements which are connected directly by an edge, and additionally all the elements which are connected indirectly by edges, wherein there may be further elements between the connected elements with such an indirect connection. In FIG. 7a, for example, elements 2 and 6 are connected indirectly by edges, although elements 3 and 5, for example, are located between their indirect edge connection. Elements 2 and 6 thus belong to the same cluster.

FIG. 7b shows a first partial cluster graph comprising elements 1, 2, 3, 4, 5 and 6 for the neighborhood graph of FIG. 7a. Elements 1, 2, 3, 4, 5 and 6 are contained only in pairs of the neighborhood set which are contained in the first cluster set. FIG. 7c shows a second partial cluster graph comprising elements 7 and 8 for the neighborhood graph of FIG. 7a.

This way of forming cluster sets is of particular advantage since the subsequent selection steps may be performed separately for each of the cluster sets determined. Performing the subsequent selection steps separately is particularly possible since a selection region may never be selected such that it covers at the same time a first and a second object of the image region when the two objects are represented by elements which belong to different pairs of different cluster sets.

Figure 3:
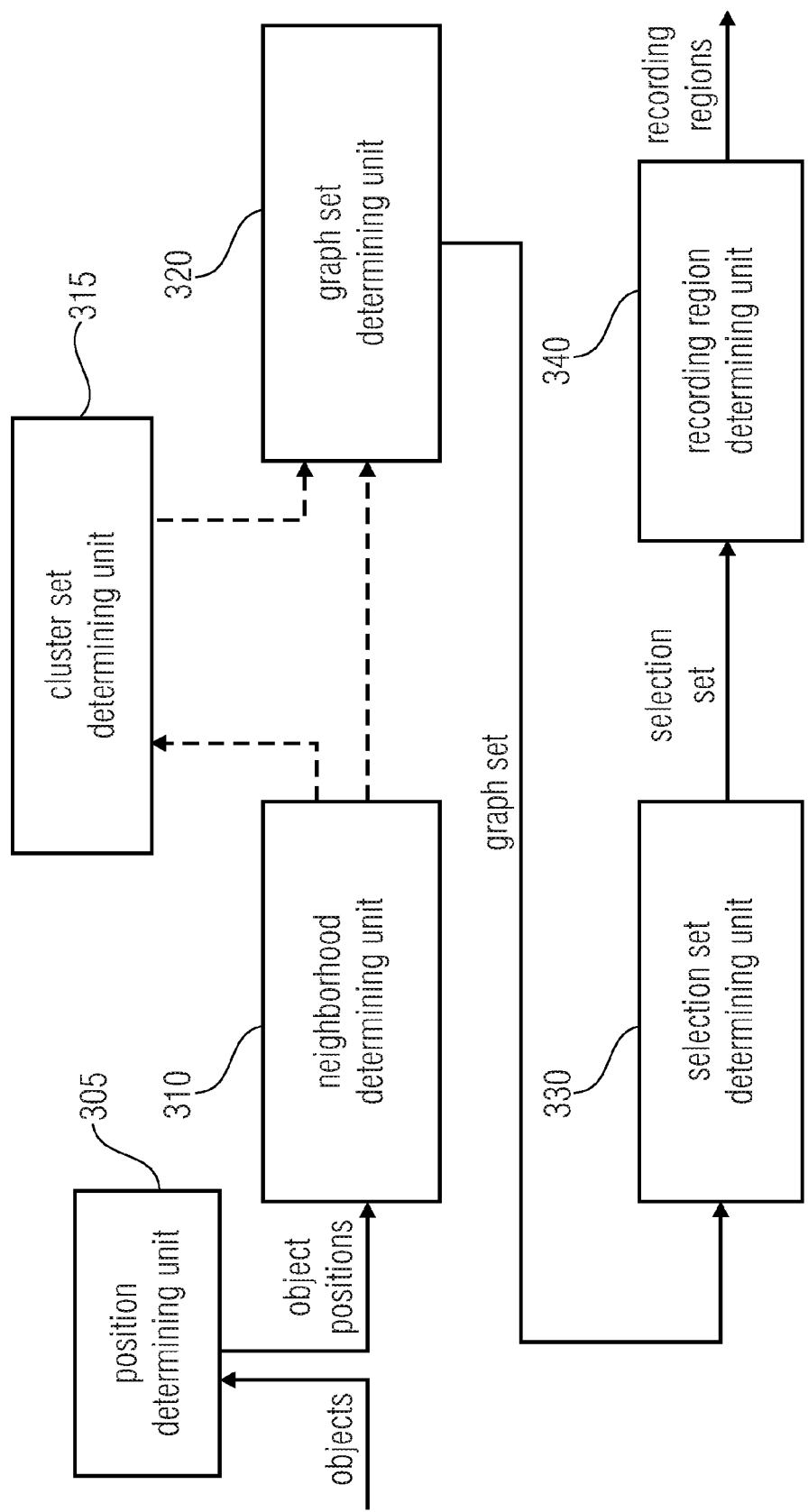
FIG. 3 shows a device for establishing one or several recording regions from an image region in accordance with another embodiment.

FIG. 3 shows a device for establishing one or several recording regions from an image region in accordance with another embodiment. Optionally, the device may contain a cluster set determining unit 315, as has already been described for the cluster set determining unit 215 of FIG. 2. In addition, the device includes a neighborhood determining unit 310, a graph set determining unit 320, a selection set determining unit 330 and a recording region determining unit 340, corresponding to the neighborhood determining unit 110, the graph set determining unit 120, the selection set determining unit 130 and the recording region determining unit 140 of FIG. 1.

In addition, the device in accordance with FIG. 3 includes a position determining unit 305. The position determining unit 305 is configured to determine an x coordinate value and a y coordinate value for every object of the image region. Thus, in the embodiment of FIG. 3, it is assumed that each object has an extension. The position determining unit is configured to reduce these objects having an extension to an individual point in the two-dimensional space. This means that subsequent calculations are simplified, the computing time necessitated for finding the recording regions is reduced further and the efficiency of finding the recording region is increased further.

The embodiment of FIG. 3 may take into consideration that a reduction of objects having an extension to a point also necessitates adjusting a maximum x distance value and a maximum y distance value which define when two objects are considered to be neighboring. This may take place such that a maximum extension of the objects in the x direction and a maximum extension of the objects in the y direction are considered.

Thus, a first maximum x distance value may be determined to be a difference of a first extension of one of the recording regions in the x direction and a first predefined maximum object extension in the x direction. A second maximum y distance value may be determined to be a difference of an extension of this recording region in the y direction and a second predefined maximum object extension in the y direction.

FIG. 5 is a graphical illustration of this, FIG. 6 showing a transformation of the problem of determining the recording region to a point problem. Transforming the objects having an extension to object points necessitates adjusting the size of the window by means of which it is determined whether two objects are neighboring. The window for determining the neighborhood is to be reduced in size correspondingly, exemplarily by a maximum extension possible of the largest one of the objects.

In accordance with another embodiment, a device is provided which is configured to perform the following process steps:
  reducing the recording region by the maximum object size to be expected. This reduces the problem of objects comprising an extension and to be covered by a recording region to determining the recording region for objects with no extension (object points).
  setting up a neighborhood graph on the basis of the predefined recording region
  forming a cluster on the basis of the neighborhood graph
  determining the complete graphs for each cluster
  determining the complete graphs for which a separate recording region is to be determined, when solving a set-cover problem
  determining the recording positions using the complete graphs established for which a separate recording region is to be determined.

A corresponding method is also provided.

Figure 4:
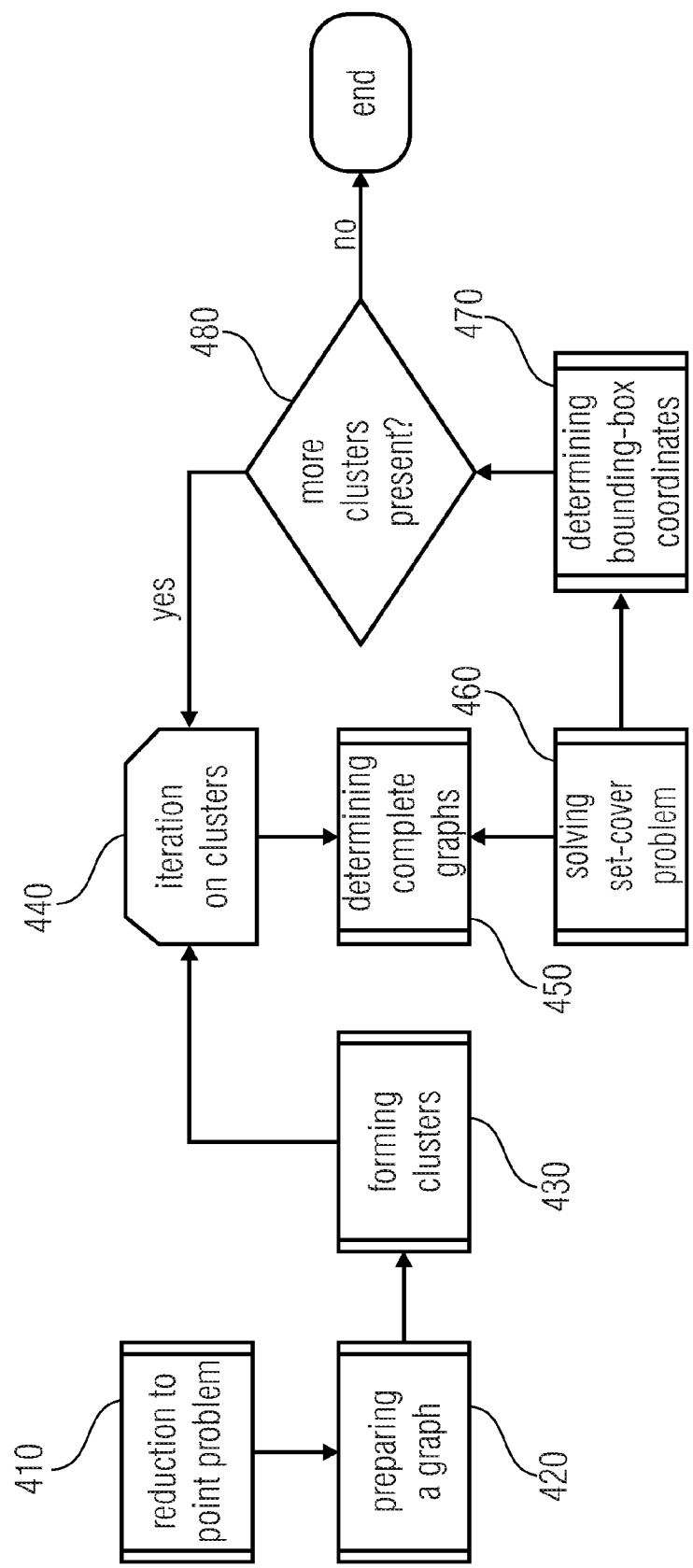
FIG. 4 illustrates a flowchart for optimizing the recording regions in accordance with an embodiment.

The steps of such a method are represented in FIG. 4. At first, in step 410, the problem is reduced to a point problem. This may exemplarily be performed by the position determining unit 305 of FIG. 3. When reducing to a point problem, objects having an extension are reduced to point-shaped objects and the maximum distance in the x and y directions where two objects are considered to be still neighboring is selected corresponding or adjusted correspondingly in dependence on a predefined maximum extension of the objects in the x and y directions, respectively.

In step 420, the neighborhood relations between all the elements of an object set are determined on the basis of a predefined recording region, the elements of the object set each representing an object of the image region. A graphic illustration of this may be found in FIG. 6b which illustrates elements 1 to 8, neighboring objects in the image region being connected to one another by an edge. The result of determining the neighborhood relations between the objects is a neighborhood graph.

In step 430, clusters are formed, as is exemplarily illustrated by FIG. 7a, FIG. 7b and FIG. 7c. FIG. 7a shows the neighborhood graph. FIG. 7b shows a first partial cluster graph describing a first cluster. FIG. 7c shows a second partial cluster graph describing a second partial cluster.

In step 440, iteration starts on a first one of the clusters found. At first, in step 450, the complete graphs of the cluster are determined. In step 460, those complete graphs which are to be covered by separate recording regions are determined using the optimizing concepts, as are subject of the embodiments. This solves the set-cover problem.

In step 470, the bounding-box coordinates are determined, i.e. the boundaries of the recording regions. Exemplarily, the centers of the recording region are determined for each complete graph selected for which a separate recording region is to be determined, and the boundary lines of the respective recording region in the x coordinate system are established based thereon.

After that, in step 480, it is checked whether there are further clusters. If this is the case, in step 440, an iteration will be performed on another one of the remaining clusters. If this is not the case, the flow will end here.

The reduction of objects having an extension to an object with no extension, i.e. to an object consisting of a point, will be described below. Such a reduction of an object to an object point may exemplarily be performed by a position determining unit 305. Reducing the objects present to a point having no extension makes the decision whether an object, such as, for example, a cell, like, for example, a blood cell of a blood smear, is completely within a recording region, easier.

In order to nevertheless take into consideration the extension of the objects, an adjusted recording region, which is reduced by the maximum object diameter to be assumed, is used for determining the neighborhood relations between the point-shaped objects. This prevents objects at the edge of the recording region from not being recorded completely and thus being of no use for further analysis.

FIG. 5 is a graphic representation of this transformation of the present problem to a point problem. The left side of FIG. 5 shows a first object 511 and a second object 512 before being transformed. Before objects 511 and 512 are transformed, both objects comprise an extension. In addition, the left side of FIG. 5 shows a first recording region 510. The first object 511, before being transformed, is completely within the first recording region 510. The second object 512, before being transformed, is not completely within the recording region 510.

The arrow 515 represents a transformation by which the first object 511 and the second object 512 are transformed to a first point-shaped object 521 and a second point-shaped object 522, respectively. In order to take the extension of the objects into consideration, the size of the first recording region is changed in the transformation insofar as the first recording region 510 is transformed by the transformation to a second recording region 520, wherein an adjusted recording region 520 which corresponds to the recording region 510 reduced by a maximum object diameter to be assumed is used for determining neighborhood relations. This prevents objects at the edge of the recording region from not being covered completely by the recording regions to be determined later and thus being of no use for, for example, further analysis.

The transformed first object 521 is included by the reduced transformed recording region 520, also after the transformation. The second transformed object 522 is, after the transformation, correctly not included by the reduced transformed recording region 520. The transformation thus does not influence the result of the decision process, only the decision itself is made easier.

It will be discussed below how it may be determined which object of an image region is neighboring to which other object of the image region. In other words, the setup of the neighborhood graph will be described. In one embodiment, the neighborhood determining unit is configured to utilize the concepts presented here for determining whether two of the objects of the object set are neighboring.

The input data for determining which of the pairs of two objects of the image regions are neighboring are K points in the two-dimensional space. This point set will in the further course exemplarily be referred to by the notation P={{$x_1$, $y_1$}, ..., {$x_k$, $y_k$}}. As it has already been illustrated, it is possible for several points of this set which represent the position of an object to be covered by a common recording region. However, it will only be possible to cover two or more points using one recording position if the distance between these points is smaller than the extension of the recording region.

In order to make a more efficient presentation of these relations between points for the further computing steps, transforming the points and their spatial relations to a graph is recommended. Setting up the graph results as follows: the nodes of the graph represent the points $P_i \in P$, $i \in [1,K]$ in the two-dimensional space. An edge in the graph results when two nodes can be covered in a common recording region. FIG. 6a illustrates the objects transformed to two-dimensional object points, namely eight objects in the two-dimensional space, numbered 1 to 8, which have each been reduced to an object point in the two-dimensional coordinate system X Y. FIG. 6b represents the neighborhood graph set up.

For accelerating the setup of the neighborhood graph, at first all the points in two-dimensional coordinates are sorted in ascending order using their x coordinates. For establishing the neighborhood relations of the individual nodes, all the points are iterated on and their neighbors are checked on as to their belonging to a recording region. Due to the sorting, only points whose x coordinate is greater than that of the point currently considered are to be taken into consideration or, expressed in a simplified manner, only those points which follow the current point in the list are to be taken into consideration. For points which may be within the recording region due to their x coordinate, it is subsequently checked whether the y coordinate is within the recording region. If both conditions are fulfilled, both points may be detected by a common recording region. This means that a neighborhood relation with the current point results for this point, which is represented in the graph by an edge between the two nodes.

Forming clusters on the basis of the graph will be discussed below. In order to reduce the future computing complexity, the neighborhood graph is broken down into its independent partial graphs. This is referred to as forming clusters, wherein each independent partial graph represents a cluster. Two partial graphs will be independent of each other if they are not connected by an edge. FIG. 7a, FIG. 7b and FIG. 7c are a graphic illustration of this process. An equivalent list is used for determining the independent partial graphs, i.e. for determining the clusters. When establishing, starting with one node of the neighborhood graph, all the neighboring nodes will be iterated on and marked as being equivalent to the current node. This process is repeated for all the nodes of the neighborhood graph. The equivalent classes resulting correspond to the partial graphs sought and define the clusters sought. FIG. 7a represents the neighborhood graph. FIG. 7b represents the first partial cluster graph and FIG. 7c represents the second partial cluster graph, which have resulted after forming clusters.

Determining the complete graphs will be discussed below. Determining the complete graphs in this way may exemplarily be performed by the graph set determining unit 120 of FIG. 1 for determining the graph set. This determining may exemplarily be performed on the independent partial graphs of the neighborhood graph which each describe a cluster of points of which the complete graphs are now to be extracted. As has already been described, a partial graph is said to be complete when all the nodes within the partial graph are connected with one another or, defined formally, when a subset $S_i$ from S has no intersection with one of the remaining subset from S, i.e. when the following condition is fulfilled:

$$S_i \not\subseteq S_j, j \neq i \quad (1)$$

This procedure is illustrated in FIG. 8a and FIG. 8b using an example of the first partial graph established when forming clusters. Starting from the set U={1, ..., 6} which contains all the nodes, complete partial graphs S={{1; 2}; {1; 4}; {2; 3}; {3; 4; 5}; {5; 6}} result.

It will be discussed below how, on the basis of the set of all the complete graphs, those complete graphs which are to be covered by a single recording region may be selected. In other words, concepts of how a selection set may be determined by a selection set determining unit on the basis of the graph set which includes all the complete graphs of the objects of the image region is provided. The result is an efficient, quick and resource-saving solution of the set-cover problem.

What has to be done here is determining a set C of subsets from S from a set of elements U={$P_1$, ..., $P_k$} and a set S={$S_1$, ..., $S_n$} of subsets of the characteristic $S_i \subseteq U$ such that the number of subsets of the set C is minimal and all the elements from U will be present in the subsets in C. In summary, a set C ⊂ S is sought such that the following will apply:

$$\bigcup_{\forall C_i \in C} C_i = U \quad (2)$$

and $$\operatorname*{argmin}_{C \subseteq S}(|C|) \quad (3)$$

Figure 9:
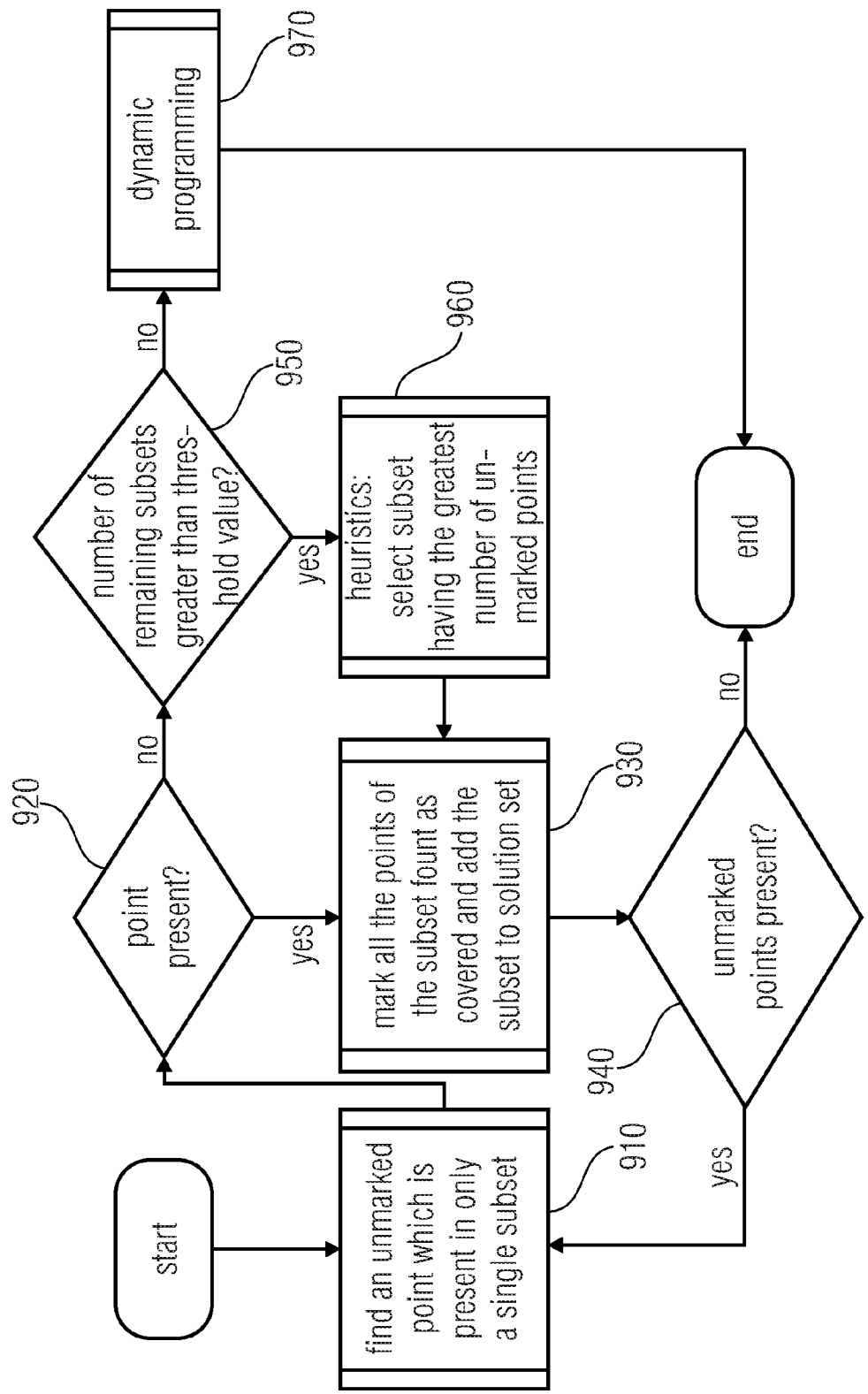
FIG. 9 shows a flowchart for determining those complete graphs for which a separate recording region is necessitated, in accordance with an embodiment, thereby achieving a solution to the set-cover problem.

The following algorithm which is illustrated in FIG. 9 is provided for efficiently solving this set-cover problem.

At first, all the elements $P_m \in U$ are iterated on and a check as to unambiguity is performed (steps 910, 920, 930 and 940). An element will be unambiguous if it is present in exactly one subset $S_i$, i.e. if the following criterion applies:

$$A=\{S_i \cap \{P_m\} | \forall S_i \in S, P_m \in U\} \text{ with } |A|=1 \quad (4)$$

If the current element fulfills the condition described in formula 4, the subset $S_i$ containing the current element will be added to the solution set C and all $P_j \in S_i$ will be marked as being covered so as to exclude same from further checks (see step 930).

If, however, the condition is not fulfilled, unambiguity will be determined for the next unmarked element from U. If there are only elements in U which do not fulfill the criterion of unambiguity and which are not marked, a separate process step will be necessitated for solving the ambiguities (see steps 950, 960 and 970 in FIG. 9). Different solution approaches are possible here.

An approach based on dynamic programming (see step 970) (for dynamic programming, see [1] and [3]) is chosen, due to the NP completeness of the problem (see [6]), with small sizes of subsets in order to achieve an optimum solution. The restriction to small sizes of subsets results from the poor scalability (with regard to runtime behavior and memory requirements) of dynamic programming approaches with large search spaces.

For this reason, a heuristic approach has been developed for large subsets (see step 960 in FIG. 9). Here, a subset $S_i$ is selected from the set of the remaining subsets which do not fulfill the condition of formula 4 and have not yet been marked as covered, added to C, and all the elements from $S_i$ are marked as covered. This may again result in unambiguity, which is why again the criterion of unambiguity is checked.

Selecting the subset $S_i$ here may be done in different ways. In accordance with one embodiment, the subset $S_i$ which contains the largest number of up to then unmarked elements may be selected. In another embodiment, a subset $S_i$ may be selected randomly.

The selection set determining unit 140 of FIG. 1 may exemplarily be configured to perform a threshold value test (see step 950 in FIG. 9) when none of the elements contained in the object set is included in precisely one of the complete graphs which are contained in the graph set. The selection set determining unit here may be configured to perform either a first selection algorithm (step 960), such as, for example, a heuristic selection algorithm, when the result of the threshold value test is that a number of the complete graphs which are contained in the graph set is larger than a predetermined threshold value, or else to perform a second, different selection algorithm (step 970), such as, for example, a selection algorithm based on dynamic programming, when the result of the threshold value test is that the number of complete graphs contained in the graph set is smaller than or equal to the predetermined threshold value. In addition, the selection set determining unit may be configured to add, when performing the first selection algorithm or the second selection algorithm, at least one of the complete graphs of the set to the selection set.

In the approach based on dynamic programming, all possible combinations for covering the present point set are taken into consideration for computing the optimum solution. Thus, in a first iteration step, any complete graph is selected for recording position, and it is established using the same method how many complete graphs are necessitated for covering all the remaining points. In a second iteration step, any other complete graph which has not yet been selected by a previous iteration is considered, and again the number of recording positions necessitated for covering the remaining points is determined. This process is repeated until all the complete graphs have been selected. The iteration having determined the smallest number of recording regions for covering all the points is selected as the optimum solution. n·(n−1)·(n−2) . . . ·2 solution possibilities result, which are checked. Using an approach of dynamic programming accelerates computing by storing intermediate results of individual iteration steps already calculated, which thus do not have to be calculated again. When, with further computing steps, there are combinations of points for which an optimum result has already been established, this may be used again. In the course of the approach proposed, an unambiguous solution may result by establishing certain recording positions for the remaining points. This accelerates the procedure additionally.

Figure 10B:
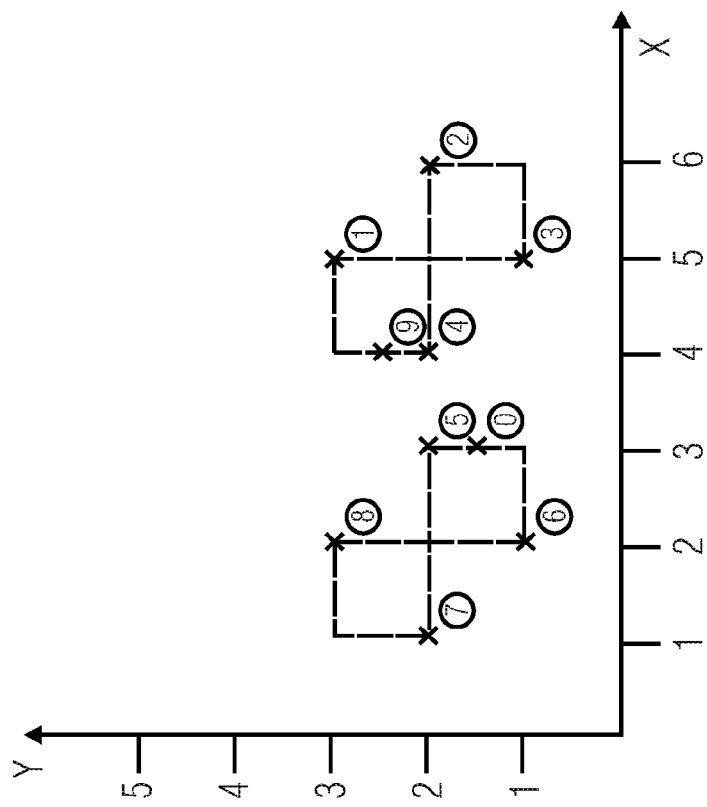
FIG. 10b illustrates point sets including marked recording regions based on dynamic programming in accordance with an embodiment.
Figure 10A:
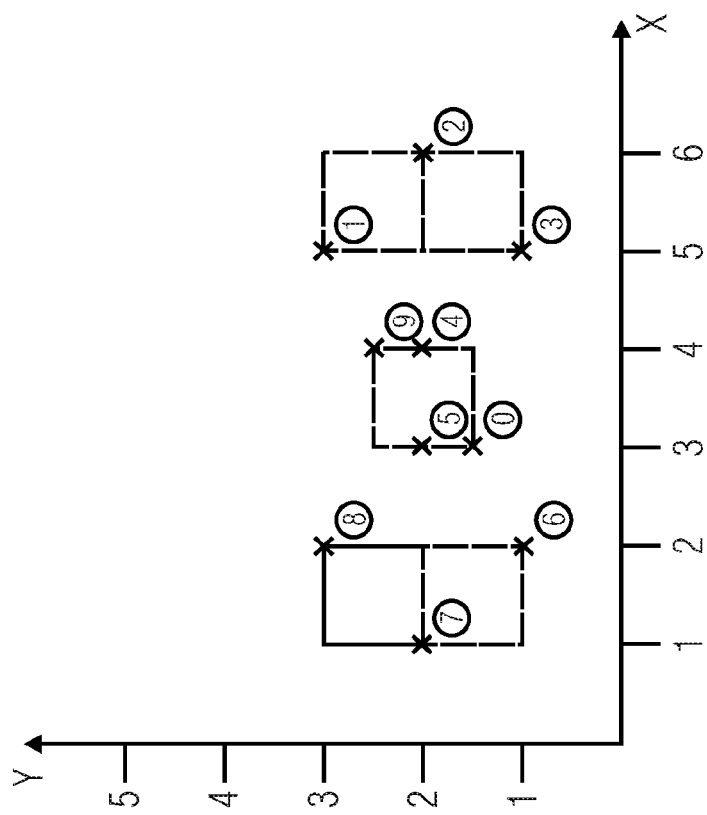
FIG. 10a illustrates point sets including marked recording regions based on heuristics in accordance with an embodiment.
Figure 11A:
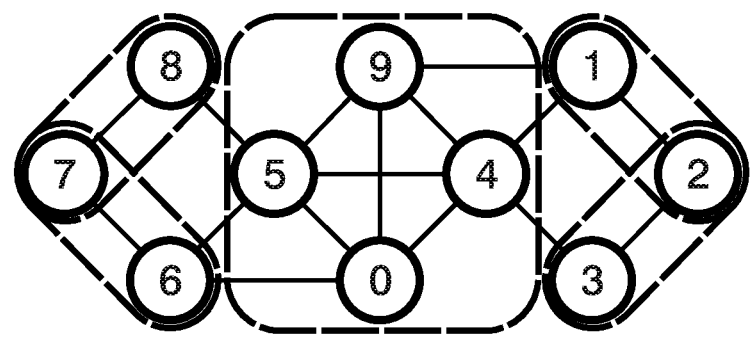
FIG. 11a shows graphs including marked complete graphs based on heuristics in accordance with an embodiment.
Figure 11B:
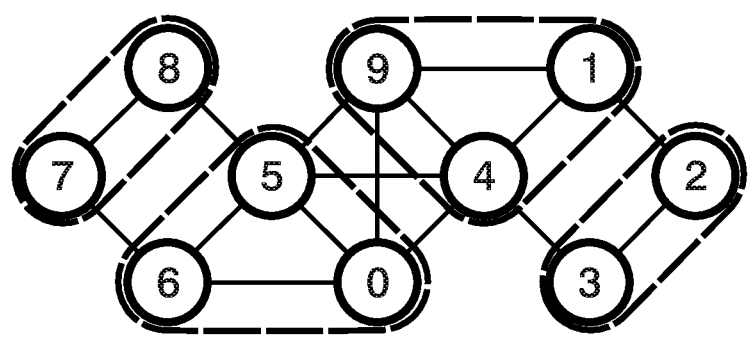
FIG. 11b illustrates graphs including marked complete graphs based on dynamic programming in accordance with an embodiment.
Figure 12:
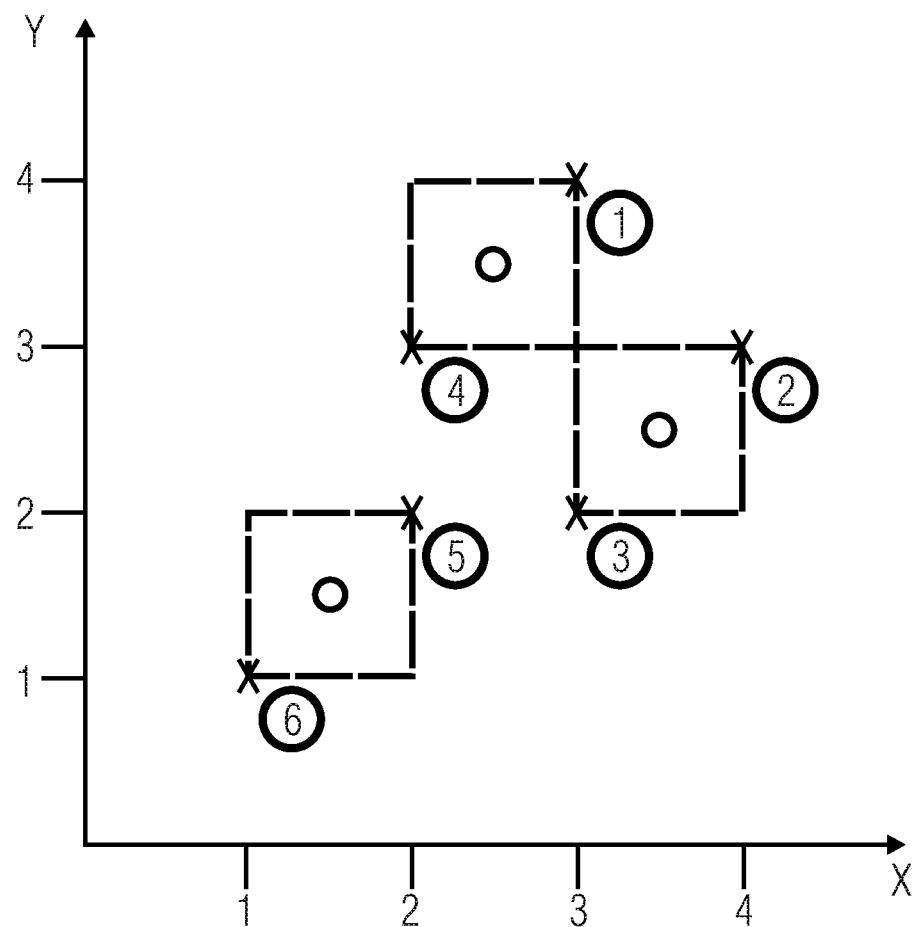
FIG. 12 shows the centers found of the recording regions.

The two approaches and their differences will be discussed below in greater detail using an example. FIG. 10a here shows a point set with recording regions marked based on heuristics. FIG. 10b shows a point set with recording regions marked based on dynamic programming. Thus, FIG. 10b shows the optimum solution found in this way for the recording regions to be determined. In FIG. 10a, what can be seen in contrast is the solution based on the heuristic approach. In the present example, it can be seen that the two results differ in the number of recording regions established. Using the approach of dynamic programming, four recording positions have been established for completely covering the point set, whereas five recording regions have resulted when applying the heuristic approach. Since the heuristic approach, as has been described before, selects the subset with the largest number of unmarked points at the beginning, the non-optimum result as shown in FIG. 10a results. Since, however, when using the approach of dynamic programming, all the possible combinations are checked, this approach will result in an optimum solution having four recording regions. FIGS. 11a and 11b are a graphic illustration of what has been described before, wherein the complete graphs which represent the recording positions established are each marked as boundaries in color. This means that FIG. 11a illustrates the complete graphs, marked by boundaries, based on heuristics. FIG. 11b shows the complete graphs, marked by boundaries, based on dynamic programming. FIG. 12 shows the centers of the recording regions. Elements 1, 2, 3, 4, 5, and 6 are shown in FIG. 12.

Determining the recording positions using the complete graphs selected (subsets), as described before, will be described below. For each subset established (i.e. for each of the complete graphs selected), the position of the recording region can be determined such that all the elements of this subset are covered. The minimum and maximum x/y positions of all the points of the final subset $C_i$ are established for this. The recording region established in this way and its center M are illustrated, wherein they are calculated as follows:

$$M_x = (\text{Max}(\{x_j | \forall j \in C_i\}) + \text{Min}(\{x_j | \forall j \in C_i\}))/2$$

$$M_y = (\text{Max}(\{y_j | \forall j \in C_i\}) + \text{Min}(\{y_j | \forall j \in C_i\}))/2 \quad (5)$$

The results of evaluating the approach presented on the basis of two-dimensional point lists having been acquired using an automated system for establishing differential blood counts are to be found in the below table. Data from 337 object slides analyzed comprising an overall number of 79562 cells are represented. On average, an object slide contained about 240 cells, since some of the object slides were samples which, caused by a certain disease pattern, had a high cell density, an additional calculation of the reduction rate was performed. Object slides in which the number of recording regions was reduced to less than 20 were excluded from calculation, the results hereof may be found in the second line of the table.

TABLE

| number of cells | number of optimized recording regions | reduction rate |
|---|---|---|
| 79562 | 48703 | 38.79% |
| 77237 | 48624 | 37.05% |

The table proves by means of the reduction rates achieved that, when applying the inventive concepts, a considerable gain in time can be achieved by reducing the number of recording regions.

Figure 13:
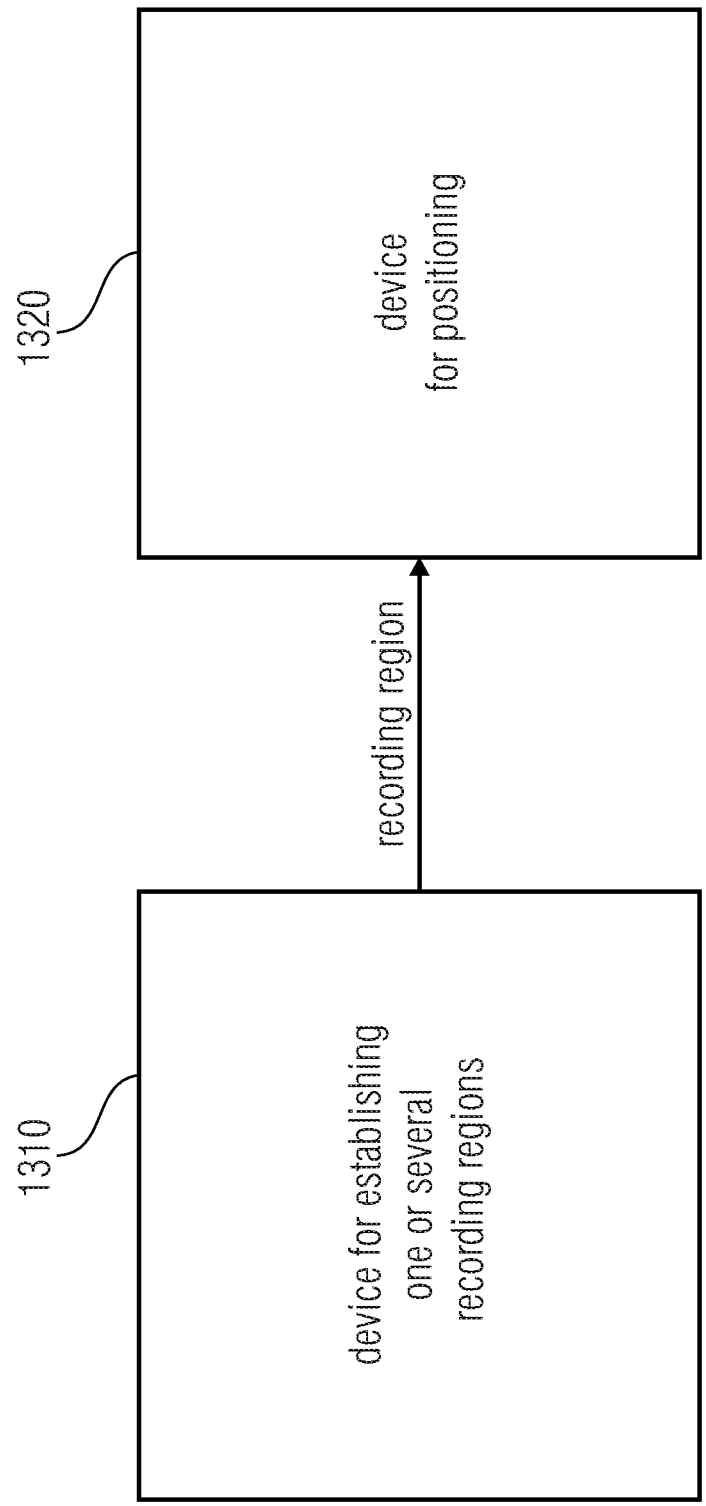
FIG. 13 shows a device for setting a camera position.

FIG. 13 shows a device for setting a camera position. The device for setting a camera position includes a device for establishing one or several recording regions in accordance with one of the above embodiments 1310 and a device for positioning 1320. The device for positioning 1320 here is configured to set the recording position of a camera based on a recording region of the recording regions determined by the selection set determining unit of the device for establishing 1310 such that this recording region can be recorded completely by the camera.

Although some aspects have been described in connection with a device, it is to be implied that these aspects also represent a description of the corresponding method such that a block or an element of a device is also to be interpreted as a corresponding method step or as a characteristic of a method step. In analogy, aspects having been described in connection with a method step or as a method step also represent a description of a corresponding block or detail or feature of a corresponding device. Some or all method steps may be performed by a hardware apparatus (or using a hardware apparatus), such as, for example, a microprocessor, a programmable computer or an electronic circuit. In some embodiments, some or several of the most important method steps may be executed by such an apparatus.

Depending on certain implementation standards, embodiments of the invention may be implemented in either hardware or software. The implementation may be performed using a digital storage medium, such as, for example, a floppy disk, a DVD, a Blu-ray disc, a CD, ROM, PROM, EPROM, EEPROM or FLASH memory, a hard drive or another magnetic or optical memory on which are stored electronically readable control signals which are able to cooperate or cooperate with a programmable computer system such that the respective method will be executed. This is why the digital storage medium may be computer-readable.

Thus, some embodiments in accordance with the invention include a data carrier comprising control signals which may be read out electronically, which are able to cooperate with a programmable computer system such that one of the methods described herein will be performed.

Generally, embodiments of the present invention may be implemented as a computer program product having a program code, the program code being operative to perform one of the methods when the computer program product runs on a computer.

The program code may exemplarily be stored on a machine-readable carrier.

Different embodiments include the computer program for performing one of the methods described herein, the computer program being stored on a machine-readable carrier. In other words, an embodiment of the inventive method is a computer program comprising a program code for performing one of the methods described herein when the computer program runs on a computer.

Thus, another embodiment of the inventive method is a data carrier (or a digital storage medium or a computer-readable medium) on which the computer program for performing one of the methods described herein is recorded.

Another embodiment of the inventive method is a data stream or a sequence of signals which represent/s the computer program for performing one of the methods described herein. The data stream or the sequence of signals may exemplarily be configured to be transferred via a data communication link, such as, for example, via the Internet.

Another embodiment includes processing means, such as, for example, a computer or a programmable logic element, configured or adjusted to perform one of the methods described herein.

Another embodiment includes a computer on which the computer program for performing one of the methods described herein is installed.

Another embodiment in accordance with the invention includes a device or a system configured to transfer a computer program for performing at least one of the methods described herein to a receiver. Transfer may exemplarily take place electronically or optically. The receiver may exemplarily be a computer, a mobile, a storage device or a similar device. The device or the system may exemplarily include a file server for transferring the computer program to the receiver.

In some embodiments, a programmable logic element (such as, for example, a field-programmable gate array or FPGA) may be used for performing some or all functionalities of the methods described herein. In some embodiments, a field-programmable gate array may cooperate with a microprocessor so as to perform one of the methods described herein. Generally, in some embodiments, the methods are performed on the part of any hardware device. This may be universally usable hardware, such as, for example, a computer processor (CPU), or hardware specific for the method, such as, for example, an ASIC.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

LITERATURE

[1] BELLMAN, R.: *Dynamic programming*. Princeton University Press, Princeton, N.Y., 1957
[2] BROTCORNE; L., G. LAPORTE and F. SEMET: *Fast heuristics for large scale covering-location problems*. Comput. Oper. Res., 29:651-665, May 2002.
[3] COOK, S. A.: *The complexity of theorem-proving procedures*. In; *Proceedings of the third annual ACM symposium on Theory of computing*, STOC '71, S. 151-158, New York, N.Y., USA, 1971. ACM
[4] FAN, G., F. LIANG and S. JIN: *An efficient Approach for Point Coverage Problem of Sensor Network*. In: *Proceedings of the* 2008 *International Symposium on Electronic Commerce and Security*. ISECS '08, pp. 124-128, 2008.
[5] HOCHBAUM, D. S. and W. MAASS: *Approximation schemes for covering and packing problems in image processing and VLSI*. J. ACM, 32:130-136, 1985
[6] KARP, R. M.: *Reducibility Among Combinatorial Problems*. In: MILLER, R. E. and J. W. THATCHER (Publisher for *Complexity of Computer Computations*, pp. 85-103, Plenum Press, 1972
[7] PORSCHEN, S.: *Algorithms for Rectangular Covering Problems*. In: ICCA [1], pp. 40-49, 2006.
[8] PORSCHEN, S.: *On Problems With Closure Properties*. In: *IMECS*, Bd. 1, pp. 258-262, 2011.

The invention claimed is:

1. A device for establishing one or several recording regions in an image region, the image region comprising objects such that the recording regions cover all the objects of the image region, an object set being defined by each element of the object set representing one of the objects of the image region each, and each object of the image region being represented by an element of the object set each, a first and a second element of the object set being neighboring when a first object of the image set represented by the first element of the object set is neighboring to a second object of the image set represented by the second element of the object set, wherein:

the device comprises a hardware apparatus;
the hardware apparatus comprises a neighborhood determining unit configured for determining whether two objects of the image region are neighboring,
the hardware apparatus comprises a graph set determining unit configured for determining a graph set such that the graph set comprises one or several complete graphs, each of the complete graphs comprising at least one element of the object set, each of the elements of the object set being comprised by at least one of the complete graphs of the graph set, each element of one of the complete graphs being neighboring to every other element of the one of the complete graphs, wherein it is impossible to form from the elements of the object set another graph comprising all the elements of one of the complete graphs of the graph set and at least another element of the object set such that each element of the another graph is neighboring to every other element of the another graph,
the hardware apparatus comprises a selection set determining unit configured for determining a selection set, the selection set determining unit being configured to determine for at least one of the elements of the object set whether the element is comprised by precisely one of the complete graphs of the graph set, and wherein the selection set determining unit is configured to add, when one of the elements of the object set is comprised by precisely one of the complete graphs of the graph set, the one of the complete graphs to the selection set, and
the hardware apparatus comprises a recording region determining unit configured for determining the one or several recording regions in the image region, the recording region determining unit being configured to determine for each of the complete graphs of the selection set, one of the recording regions in the image region each such that each of the recording regions covers all the objects of the image region which are represented by the elements of its complete graph; wherein
at least one of the neighborhood determining unit, the graph set determining unit, the selection set determining unit, and the recording region determining unit is implemented using a combination of the hardware apparatus and a computer.

2. The device in accordance with claim 1, wherein the selection set determining unit is configured to determine the selection set such that all the elements of the object set are comprised in at least one of the complete graphs of the selection set.

3. The device in accordance with claim 1,
wherein the selection set determining unit is configured to remove, when one of the elements of the object set is comprised by precisely one of the complete graphs of the graph set, the one of the complete graphs from the graph set, and to remove the elements of the one of the complete graphs from the object set, and
wherein the selection set determining unit is configured to determine whether at least one of the elements still comprised in the object set is comprised by precisely one of the complete graphs still comprised in the graph set.

4. The device in accordance with claim 1,
wherein the selection set determining unit is configured to perform a threshold value test when no one of the elements comprised in the object set is comprised by precisely one of the complete graphs comprised in the graph set, and
wherein the selection set determining unit is configured to perform either a first selection algorithm when the result of the threshold value test is that a number of the complete graphs comprised in the graph set is greater than a predetermined threshold value, or else to execute a second, different selection algorithm when the result of the threshold value test is that the number of the complete graphs comprised in the graph set is smaller than or equaling the predetermined threshold value,
wherein the selection set determining unit is configured to add, when executing the first selection algorithm or the second selection algorithm, at least one of the complete graphs of the graph set to the selection set.

5. The device in accordance with claim 4, wherein the selection set determining unit is configured to select, when executing the first selection algorithm, one of the complete graphs of the graph set which comprises the greatest number of elements of all the complete graphs of the graph set.

6. The device in accordance with claim 4, wherein the selection set determining unit is configured, when performing the second selection algorithm, to determine from the complete graphs of the graph set and add to the selection set that complete graph for which the number of the further complete graphs which are added to the selection set in order for the selection set to comprise all the elements of the object set, is minimal.

7. The device in accordance with claim 4, wherein the selection set determining unit is configured to use an algorithm which is based on dynamic programming as the second selection algorithm.

8. The device in accordance with claim 1,
wherein a position is associated to each of the objects of the image region, the position comprising an x coordinate value and a y coordinate value, and
wherein the neighborhood determining unit is configured to determine whether two of the objects of the image region are neighboring such that two of the objects of the image region are neighboring exactly when a first absolute difference of the x coordinate values of the two objects is smaller than or equaling a first maximum x distance value, and when a second absolute difference of the y coordinate values of the two objects is smaller than or equaling a second maximum y distance value.

9. The device in accordance with claim 8, wherein the neighborhood determining unit additionally is configured to provide a neighborhood set for determining a graph set by the graph set determining unit, the neighborhood set comprising all the pairs of elements of the object set such that each of the pairs comprises two elements which represent two objects of the image region which are neighboring.

10. The device in accordance with claim 9,
wherein the device additionally comprises an object sorting unit, the object sorting unit being configured to sort the elements of the object set based on the x coordinate values of the objects of the image region which are represented by the elements of the object set so as to acquire a sorted arrangement of the elements of the object set, and
wherein the neighborhood determining unit is configured to determine the neighborhood set based on the sorted arrangement of the elements of the object set.

11. The device in accordance with claim 10, wherein the neighborhood determining unit is configured to determine the neighborhood set such that, for an element considered from the sorted arrangement of the elements of the object set, in an order predetermined by the sorted arrangement, starting with the direct successor of the element considered, one of the successors of the element considered each is checked as to whether the element considered and the respective successor are neighboring until the absolute difference of the x coordinate values of the object represented by the element considered and the object represented by the successor is greater than the first maximum x distance value.

12. The device in accordance with claim 9,
wherein the device additionally comprises a cluster set determining unit configured to determine one or several cluster sets based on the neighborhood set such that each of the pairs of the neighborhood sets is comprised in precisely one of the cluster sets, no pair of one of the cluster sets comprising an element which is neighboring to an element of another pair of another cluster set,
wherein the graph set determining unit is configured to determine the graph set based on the one or several cluster sets.

13. The device in accordance with claim 8, wherein the device additionally comprises a position determining unit, each of the objects of the object set comprising an extension, and the position determining unit being configured to determine for each object the x coordinate value associated to the object and they coordinate value of the object associated to the object by establishing a selected x coordinate value of the object and a selected y coordinate value of the object, the selected x coordinate value and the selected y coordinate value identifying a position within the object or on a borderline of the object.

14. The device in accordance with claim 13, wherein the position determining unit is configured to determine the first maximum x distance value as a difference of a first extension of one of the recording regions in the x direction and a first predefined maximum object extension in the x direction, and the position determining unit being further configured to determine the second maximum y distance value as a difference of an extension of the one of the recording regions in the y direction and a second predefined maximum object extension in the y direction.

15. The device in accordance with claim 1, wherein the recording region determining unit is configured to determine, for each of the complete graphs of the selection set, a center for the respective one of the recording regions by applying the following formula:

$$M_x=(\text{Max}(\{x_j|\forall j \in C_i\})+\text{Min}(\{x_j|\forall j \in C_i\}))/2$$

$$M_y=(\text{Max}(\{y_j|\forall j \in C_i\})+\text{Min}(\{y_j|\forall j \in C_i\}))/2$$

$C_i$ identifying a set identifying the i-th complete graph of the selection set, j representing the j-th element of the elements comprised in the i-th complete graph, $x_j$ representing the x coordinate value of the object represented by the j-th element of the i-th complete graph, $y_j$ representing the y coordinate value of the object represented by the j-th element of the i-th complete graph, Max identifying a maximum, and Min identifying a minimum.

16. A device for setting a camera position,
wherein:
the device comprises a hardware apparatus;
the hardware apparatus comprises a device for establishing one or several recording regions in an image region, the image region comprising objects such that the recording regions cover all the objects of the image region, an object set being defined by each element of the object set representing one of the objects of the image region each, and each object of the image region being represented by an element of the object set each, a first and a second element of the object set being neighboring when a first object of the image set represented by the first element of the object set is neighboring to a second object of the image set represented by the second element of the object set, the device comprising: a neighborhood determining unit configured for determining whether two objects of the image region are neighboring, a graph set determining unit configured for determining a graph set such that the graph set comprises one or several complete graphs, each of the complete graphs comprising at least one element of the object set, each of the elements of the object set being comprised by at least one of the complete graphs of the graph set, each element of the complete graphs being neighboring to every other element of one of the complete graphs, wherein it is impossible to form from the elements of the object set another graph comprising all the elements of one of the complete graphs of the graph set and at least another element of the object set such that each element of the another graph is neighboring to every other element of the another graph, a selection set determining unit configured for determining a selection set, the selection set determining unit being configured to determine for at least one of the elements of the object set whether the element is comprised by precisely one of the complete graphs of the graph set, and wherein the selection set determining unit is configured to add, when one of the elements of the object set is comprised by precisely one of the complete graphs of the graph set, the one of the complete graphs to the selection set, and a recording region determining unit configured for determining the one or several recording regions in the image region, the recording region determining unit being configured to determine for each of the complete graphs of the selection set, one of the recording regions in the image region each such that each of the recording regions covers all the objects of the image region which are represented by the elements of its complete graph, wherein at least one of the neighborhood determining unit, the graph set determining unit, the selection set determining unit, and the recording region determining unit is implemented using a combination of the hardware apparatus and a computer, and the hardware apparatus comprises a device configured for positioning, the device for positioning being configured to set the recording position of a camera based on the one of the recording regions determined by the selection set determining unit such that the one of the recording regions can be recorded completely by the camera.

17. A method for establishing one or several recording regions in an image region, the image region comprising objects such that the recording regions cover all the objects of the image region, an object set being defined by each element of the object set representing one of the objects of the image region each, and each object of the image region being represented by an element of the object set each, a first and a second element of the object set being neighboring when a first object of the image set represented by the first element of the object set is neighboring to a second object of the image set represented by the second element of the object set, the method comprising:

determining, by a hardware apparatus, whether two objects of the image region are neighboring, determining, by the hardware apparatus, a graph set such that the graph set comprises one or several complete graphs, each of the complete graphs comprising at least one element of the object set, each of the elements of the object set being comprised by at least one of the complete graphs of the graph set, each element of one of the complete graphs being neighboring to every other element of the one of the complete graphs, wherein it is impossible to form from the elements of the object set another graph which comprises all the elements of one of the complete graphs of the graph set and at least another element of the object set such that each element of the another graph is neighboring to every other element of the another graph, determining, by the hardware apparatus, a selection set, wherein it is determined for at least one of the elements of the object set whether the element is comprised by precisely one of the complete graphs of the graph set, and wherein, when one of the elements of the object set is comprised by precisely one of the complete graphs of the graph set, the one of the complete graphs is added to the selection set, and determining, by the hardware apparatus, the one or several recording regions in the image region, wherein one of the recording regions in the image region each is determined for each of the complete graphs of the graph set such that each of the recording regions covers all the objects of the image region represented by the elements of its complete graph; wherein the method is performed using the hardware apparatus, using a computer, or using a combination of the hardware apparatus and a computer.

18. A non-transitory computer readable medium including a computer program for performing a method, when the computer program runs on a computer or microprocessor, for establishing one or several recording regions in an image region, the image region comprising objects such that the recording regions cover all the objects of the image region, an object set being defined by each element of the object set representing one of the objects of the image region each, and each object of the image region being represented by an element of the object set each, a first and a second element of the object set being neighboring when a first object of the image set represented by the first element of the object set is neighboring to a second object of the image set represented by the second element of the object set, the method comprising: determining, by the computer or the microprocessor, whether two objects of the image region are neighboring, determining, by the computer or the microprocessor, a graph set such that the graph set comprises one or several complete graphs, each of the complete graphs comprising at least one element of the object set, each of the elements of the object set being comprised by at least one of the complete graphs of the graph set, each element of one of the complete graphs being neighboring to every other element of the one of the complete graphs, wherein it is impossible to form from the elements of the object set another graph which comprises all the elements of one of the complete graphs of the graph set and at least another element of the object set such that each element of the another graph is neighboring to every other element of the another graph, determining, by the computer or the microprocessor, a selection set, wherein it is determined for at least one of the elements of the object set whether the element is comprised by precisely one of the complete graphs of the graph set, and wherein, when one of the elements of the object set is comprised by precisely one of the complete graphs of the graph set, the one of the complete graphs is added to the selection set, and determining, by the computer or the microprocessor, the one or several recording regions in the image region, wherein one of the recording regions in the image region each is determined for each of the complete graphs of the graph set such that each of the recording regions covers all the objects of the image region represented by the elements of its complete graph.

* * * * *

UNITED STATES PATENT AND TRADEMARK OFFICE
CERTIFICATE OF CORRECTION

PATENT NO. : 9,843,718 B2
APPLICATION NO. : 13/848943
DATED : December 12, 2017
INVENTOR(S) : Thorsten Zerfass et al.

Page 1 of 1

It is certified that error appears in the above-identified patent and that said Letters Patent is hereby corrected as shown below:

In the Claims

Claim 13, Column 22, Line 29 should read as follows:
--…object and the y coordinate value of the object associated to…--

Signed and Sealed this
Fifth Day of June, 2018

Andrei Iancu
*Director of the United States Patent and Trademark Office*